US012264813B2

(12) United States Patent
Miedema et al.

(10) Patent No.: US 12,264,813 B2
(45) Date of Patent: *Apr. 1, 2025

(54) MODULAR LUMINAIRES FOR APPLIANCE LIGHTING

(71) Applicant: GEMTRON CORPORATION, Sweetwater, TN (US)

(72) Inventors: Greg Miedema, Spring Lake, MI (US); Craig Bienick, Jenison, MI (US)

(73) Assignee: GEMTRON CORPORATION, Sweetwater, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/389,928

(22) Filed: Dec. 20, 2023

(65) Prior Publication Data

US 2024/0117962 A1 Apr. 11, 2024

Related U.S. Application Data

(63) Continuation of application No. 15/978,961, filed on May 14, 2018, now Pat. No. 11,920,776, which is a (Continued)

(51) Int. Cl.

*F21V 33/00* (2006.01)
*F21V 5/04* (2006.01)
(Continued)

(52) U.S. Cl.

CPC ............ *F21V 33/0044* (2013.01); *F21V 5/04* (2013.01); *F21V 33/0012* (2013.01); (Continued)

(58) Field of Classification Search

CPC ............. F21V 33/0044; F21V 33/0012; F21V 33/002; F21V 33/0024; F21V 5/04; A47B 2220/0077

See application file for complete search history.

(56) References Cited

U.S. PATENT DOCUMENTS

| | | | |
|---|---|---|---|
| 3,506,325 | A | 4/1970 | Horvay |
| 4,973,796 | A | 11/1990 | Dougherty et al. |

(Continued)

FOREIGN PATENT DOCUMENTS

| | | | |
|---|---|---|---|
| CN | 1727748 | A | 2/2006 |
| CN | 201377735 | Y | 1/2010 |

(Continued)

OTHER PUBLICATIONS

Chinese Patent Application No. 202010870105.8, First Office Action, dated Mar. 29, 2022.

(Continued)

*Primary Examiner* — Evan P Dzierzynski
*Assistant Examiner* — Nathaniel J Lee
(74) *Attorney, Agent, or Firm* — MARSHALL, GERSTEIN & BORUN LLP

(57) ABSTRACT

The luminaires of the present disclosure provide a slim profile and simple construction for use in a variety of lighting applications. A circuit board can have a plurality of light sources thereon, and a lens can at least partially encapsulate the circuit board to protect and electrically insulate the circuit board. When used, for example, in a lighted shelf application, power can be provided to the luminaire through shelf brackets along the side of the shelf panel.

25 Claims, 49 Drawing Sheets

Related U.S. Application Data continuation of application No. 14/310,350, filed on Jun. 20, 2014, now Pat. No. 9,995,477.

(60) Provisional application No. 61/837,519, filed on Jun. 20, 2013.

(51) Int. Cl.

| | |
|---|---|
| ***F21V 7/00*** | (2006.01) |
| *F21W 131/301* | (2006.01) |
| *F21W 131/305* | (2006.01) |
| *F21W 131/307* | (2006.01) |
| *F21Y 103/10* | (2016.01) |
| *F21Y 105/00* | (2016.01) |
| *F21Y 115/10* | (2016.01) |

(52) U.S. Cl.
CPC ........ *F21V 33/002* (2013.01); *F21V 33/0024* (2013.01); *A47B 2220/0077* (2013.01); *F21V 7/00* (2013.01); *F21V 7/005* (2013.01); *F21V 7/0091* (2013.01); *F21W 2131/301* (2013.01); *F21W 2131/305* (2013.01); *F21W 2131/307* (2013.01); *F21Y 2103/10* (2016.08); *F21Y 2105/00* (2013.01); *F21Y 2115/10* (2016.08)

(56) References Cited

U.S. PATENT DOCUMENTS 5,034,861 A * 7/1991 Sklenak .................. A47F 3/001 312/236
5,287,252 A * 2/1994 Caruso .................... F25D 25/02 362/396
5,403,083 A 4/1995 Dasher et al.
5,425,648 A 6/1995 Farham
5,429,433 A 7/1995 Bird et al.
5,454,638 A 10/1995 Bird et al.
5,564,809 A 10/1996 Kane et al.
5,690,415 A 11/1997 Krehl
5,735,589 A 4/1998 Herrmann et al.
5,745,514 A 4/1998 Patel et al.
6,042,244 A 3/2000 Witkoski
6,120,720 A 9/2000 Meier et al.
6,179,434 B1 1/2001 Saraiji
6,210,013 B1 4/2001 Bousfield
6,231,205 B1 5/2001 Slesinger et al.
6,340,113 B1 1/2002 Avery et al.
6,364,273 B1 4/2002 Otema
6,431,721 B2 8/2002 Shemitz et al.
6,558,017 B1 5/2003 Saraiji et al.
6,578,979 B2 6/2003 Truttmann-Battig
6,726,341 B2 4/2004 Pashley et al.
6,786,562 B2 9/2004 Obrock et al.
6,813,896 B1 11/2004 Janke et al.
6,827,463 B2 12/2004 Chuang et al.
7,005,805 B2 2/2006 Ahn
7,080,920 B2 7/2006 Fitzsimmons et al.
7,107,779 B2 9/2006 Avenwedde et al.
7,121,675 B2 10/2006 Ter-Hovhannisian
7,163,305 B2 1/2007 Bienick
7,210,808 B2 5/2007 Malpetti
7,273,299 B2 9/2007 Parkyn et al.
7,338,180 B2 3/2008 Wing
7,434,951 B2 10/2008 Bienick
7,574,822 B1 8/2009 Moore
7,600,887 B2 10/2009 Sherman
7,748,806 B2 7/2010 Egan
7,766,502 B2 8/2010 Tress
7,806,543 B2 10/2010 Swofford et al.
7,824,055 B2 11/2010 Sherman
7,840,286 B2 11/2010 Caldwell et al.
7,976,181 B2 7/2011 Kelly et al.
8,135,482 B2 3/2012 Caldwell et al.
8,136,956 B2 3/2012 Oketeni et al.
8,215,795 B2 7/2012 Pichel
8,322,873 B2 12/2012 Glovatsky et al.
8,360,802 B2 1/2013 Allard et al.
8,453,476 B2 6/2013 Kendall et al.
8,459,817 B2 6/2013 Alberghetti et al.
8,678,616 B2 3/2014 Marquardt et al.
8,944,621 B2 2/2015 Driver et al.
8,967,740 B2 3/2015 Kerner
8,979,296 B2 3/2015 Wiemer et al.
9,098,823 B2 8/2015 Slesinger et al.
9,157,678 B2 10/2015 Kerner
9,287,021 B2 3/2016 Hammond et al.
9,480,346 B2 11/2016 Houle
9,595,373 B2 3/2017 Hammond et al.
9,766,010 B2 9/2017 Katu et al.
9,989,298 B1 6/2018 Wantland et al.
10,340,741 B2 7/2019 Lee et al.
11,779,132 B2 10/2023 McMillin et al.
11,920,776 B2 * 3/2024 Miedema ............ F21V 33/0024
2003/0038571 A1 2/2003 Obrock et al.
2003/0137828 A1 7/2003 Ter-Hovhannisian
2004/0212990 A1 10/2004 Becker
2004/0264160 A1 12/2004 Bienick
2005/0093408 A1 5/2005 Koloff et al.
2006/0029808 A1 2/2006 Zhai et al.
2006/0137378 A1 6/2006 Choi
2006/0216476 A1 9/2006 Ganti et al.
2007/0058369 A1 3/2007 Parkyn et al.
2007/0075199 A1 4/2007 Stewart et al.
2007/0104841 A1 5/2007 Min et al.
2007/0109764 A1 5/2007 Bienick
2007/0127229 A1 6/2007 Lee et al.
2007/0144196 A1 6/2007 Currie
2007/0151274 A1 7/2007 Roche et al.
2007/0180843 A1 8/2007 Park et al.
2007/0266723 A1 11/2007 Lee et al.
2008/0007945 A1 1/2008 Kelly et al.
2008/0037239 A1 2/2008 Thomas et al.
2008/0043456 A1 2/2008 Bernardini et al.
2008/0092782 A1 4/2008 Daniel
2008/0121146 A1 5/2008 Burns et al.
2008/0158858 A1 7/2008 Madireddi et al.
2008/0186695 A1 8/2008 Awai et al.
2008/0186696 A1 8/2008 Awai et al.
2008/0205044 A1 8/2008 Shibusawa et al.
2008/0278932 A1 11/2008 Tress
2009/0002990 A1 1/2009 Becker et al.
2009/0021927 A1 1/2009 Hall et al.
2009/0091271 A1 4/2009 Zulim et al.
2009/0250715 A1 10/2009 Lee et al.
2009/0316391 A1 * 12/2009 Huang .................... A47F 3/001 362/133
2010/0006519 A1 1/2010 Van De Steen
2010/0097780 A1 4/2010 Beatenbough et al.
2010/0135020 A1 * 6/2010 Moore .................. F21V 15/015 362/249.02
2010/0195317 A1 8/2010 Oketani
2010/0259148 A1 10/2010 Alberghetti et al.
2011/0051401 A1 3/2011 Bauer et al.
2011/0096533 A1 4/2011 Sekela
2011/0164399 A1 7/2011 Driver et al.
2011/0203302 A1 8/2011 Alberghetti et al.
2011/0204009 A1 8/2011 Karan
2011/0273867 A1 11/2011 Horst et al.
2012/0106129 A1 5/2012 Glovatsky et al.
2012/0230018 A1 9/2012 Wiemer et al.
2013/0122739 A1 5/2013 Allard et al.
2013/0188356 A1 7/2013 Breslow et al.
2013/0286651 A1 * 10/2013 Takeuchi ................ F21V 17/02 362/249.02
2014/0060095 A1 3/2014 Shur et al.
2014/0111118 A1 4/2014 Kendall et al.
2014/0140040 A1 5/2014 Giacomini et al.
2014/0349502 A1 11/2014 Meis
2014/0376213 A1 12/2014 Miedema et al.
2015/0023000 A1 1/2015 Kendall et al.
2015/0308653 A1 10/2015 Wang et al.
2016/0097516 A1 4/2016 Howard
2016/0341470 A1 11/2016 Brown et al.
2016/0356544 A1 12/2016 Kerner

(56) References Cited

U.S. PATENT DOCUMENTS

| | | | |
|---|---|---|---|
| 2017/0074581 A1 | 3/2017 | Kerner | |
| 2017/0100495 A1 | 4/2017 | Shur et al. | |
| 2017/0191743 A1 | 7/2017 | Lee et al. | |
| 2017/0368215 A1 | 12/2017 | Shatalov et al. | |
| 2018/0221521 A1 | 8/2018 | Shur et al. | |
| 2018/0243458 A1 | 8/2018 | Shatalov et al. | |
| 2018/0306971 A1 | 10/2018 | Conrad | |
| 2021/0330081 A1 | 10/2021 | McMillin et al. | |
| 2023/0122053 A1 | 4/2023 | McMillin et al. | |

FOREIGN PATENT DOCUMENTS

| | | | |
|---|---|---|---|
| CN | 101791180 | A | 8/2010 |
| CN | 201875445 | U | 6/2011 |
| CN | 201977332 | U | 9/2011 |
| CN | 201999332 | U | 10/2011 |
| CN | 102656404 | A | 9/2012 |
| CN | 202504813 | U | 10/2012 |
| CN | 102980089 | A | 3/2013 |
| CN | 202886235 | U | 4/2013 |
| CN | 103104892 | A | 5/2013 |
| CN | 107192213 | A | 9/2017 |
| DE | 202009010551 | U1 | 12/2009 |
| DE | 202010005347 | U1 | 8/2010 |
| DE | 102009002503 | A1 | 10/2010 |
| DE | 202009018504 | U1 | 12/2011 |
| DE | 102015007839 | A1 | 12/2016 |
| EP | 1174661 | A1 | 1/2002 |
| EP | 1222885 | A1 | 7/2002 |
| EP | 1503159 | A2 | 2/2005 |
| EP | 1887299 | A2 | 2/2008 |
| EP | 1961340 | A1 | 8/2008 |
| EP | 2161496 | A1 | 3/2010 |
| EP | 3558305 | A1 | 10/2019 |
| JP | 2002313133 | A | 10/2002 |
| JP | 2004081521 | A | 3/2004 |
| JP | 2004344507 | A | 12/2004 |
| JP | 2010170970 | A | 8/2010 |
| JP | 2010182520 | A | 8/2010 |
| JP | 2010264226 | A | 11/2010 |
| JP | 2012040334 | A | 3/2012 |
| KR | 200343464 | Y1 | 3/2004 |
| KR | 787552 | B1 | 12/2007 |
| KR | 20110034271 | A | 4/2011 |
| KR | 20190110975 | A | 10/2019 |
| KR | 20190137480 | A | 12/2019 |
| KR | 20200068411 | A | 6/2020 |
| WO | WO-2006/126584 | A1 | 11/2006 |
| WO | WO-2007020470 | A1 | 2/2007 |
| WO | WO-2013034497 | A1 | 3/2013 |

OTHER PUBLICATIONS

International Application No. PCT/US2022/046373, International Search Report and Written Opinion, mailed Feb. 16, 2023.

International Application No. PCT/US2022/046376, International Search Report and Written Opinion of the International Searching Authority, mailing date Jan. 20, 2023.

International Application No. PCT/US2022/046381, International Search Report and Written Opinion, mailed Jan. 20, 2023.

International Preliminary Report on Patentability dated Dec. 22, 2015 for corresponding International Patent Application No. PCT/US2014/43418, 7 pages.

International Search Report dated Oct. 31, 2014 for PCT application No. PCT/US2014/43418, 3 pages.

Written Opinion dated Oct. 31, 2014 for PCT application No. PCT/US2014/43418, 6 pages.

* cited by examiner

MODULAR LUMINAIRES FOR APPLIANCE LIGHTING

CROSS-REFERENCE TO RELATED APPLICATIONS

This is a continuation of U.S. patent application Ser. No. 15/978,961, filed May 14, 2018, which is a continuation of U.S. patent application Ser. No. 14/310,350, filed Jun. 20, 2014, which in turn claims priority to U.S. Provisional Patent Application No. 61/837,519, filed Jun. 20, 2013, each of which is herein incorporated by reference.

BACKGROUND OF THE DISCLOSURE

1. Field of the Disclosure

The present disclosure relates to luminaires for lighting applications. More particularly, the present disclosure relates to slim profile, modular luminaires that can be used in a variety of appliance applications, such as refrigerators.

2. Description of the Related Art

There is a continuing need to develop simple and efficient lighting for applications in various aspects and locations of appliances, such as refrigerators, ovens, clothes washers and dryers, and dishwashers.

SUMMARY OF THE DISCLOSURE

The present disclosure provides a modular and slim-profiled luminaire for lighting in appliances. The luminaires of the present disclosure comprise a printed circuit board with a plurality of light sources thereon, a lens for focusing and directing the light emitted by the light sources, and a housing that can position or connect the lens and circuit board together. The housing can also be used as an integral component to the luminaire, e.g. as a reflector. In some embodiments, the luminaire is integrated into a shelf or drawer, so that part of the shelf or drawer is used in the luminaire assembly. The luminaire can be removably connected to the shelves or drawers, permanently connected thereto, or encapsulated in the frame of the shelf or drawer.

In one embodiment, the present disclosure provides a luminaire comprising a board (e.g., a printed circuit board) having one or more light sources (e.g., light-emitting diodes) thereon, a lens connected to the board for diffusing or directing the light emitted by the light sources, and a housing that provides additional direction or diffusion of the light, and/or facilitates connection of the luminaire to a shelf assembly. The board can be connected to the lens and/or housing with an adhesive, or other physical connection methods, such as a snap fit. The luminaire can be permanently or removably connected to a glass shelf panel and/or frame of a shelf assembly.

In another embodiment, the present disclosure provides a shelf assembly having a luminaire integrally formed therein, meaning that the luminaire is formed as a unitary component with the shelf assembly. The shelf assembly includes a glass shelf panel, a frame connected to an edge thereof, and a light assembly encapsulated in the frame. The light assembly includes a board having at least one light source thereon, and a lens connected to the board for diffusing or directing the light emitted by the diodes.

In another embodiment, the present disclosure provides a shelf assembly comprising a shelf panel having a top surface and a bottom surface, and a luminaire connected to the bottom surface. The luminaire comprising a circuit board having a plurality of lights thereon, and a lens connected to and at least partially encapsulating the circuit board, so that the circuit board and the lens each contact the bottom surface of the shelf panel. The lens directs light emanating from the circuit board toward the shelf panel.

DETAILED DESCRIPTION OF THE DISCLOSURE

The present disclosure provides a lighting module, known as a "luminaire", for illumination of one or more glass shelves or interior spaces in an appliance. In one embodiment, the appliance is a refrigerator. Advantageously, the luminaires of the present disclosure are modular, and can be used with shelving in various ways. As will be discussed in greater detail below, the luminaire can be integrated into the shelving unit, removably or permanently connected to the same, or adapted to a particular shelf's size or dimensions. This allows for the use of the luminaires of the present disclosure in a variety of different applications.

Figure 1:
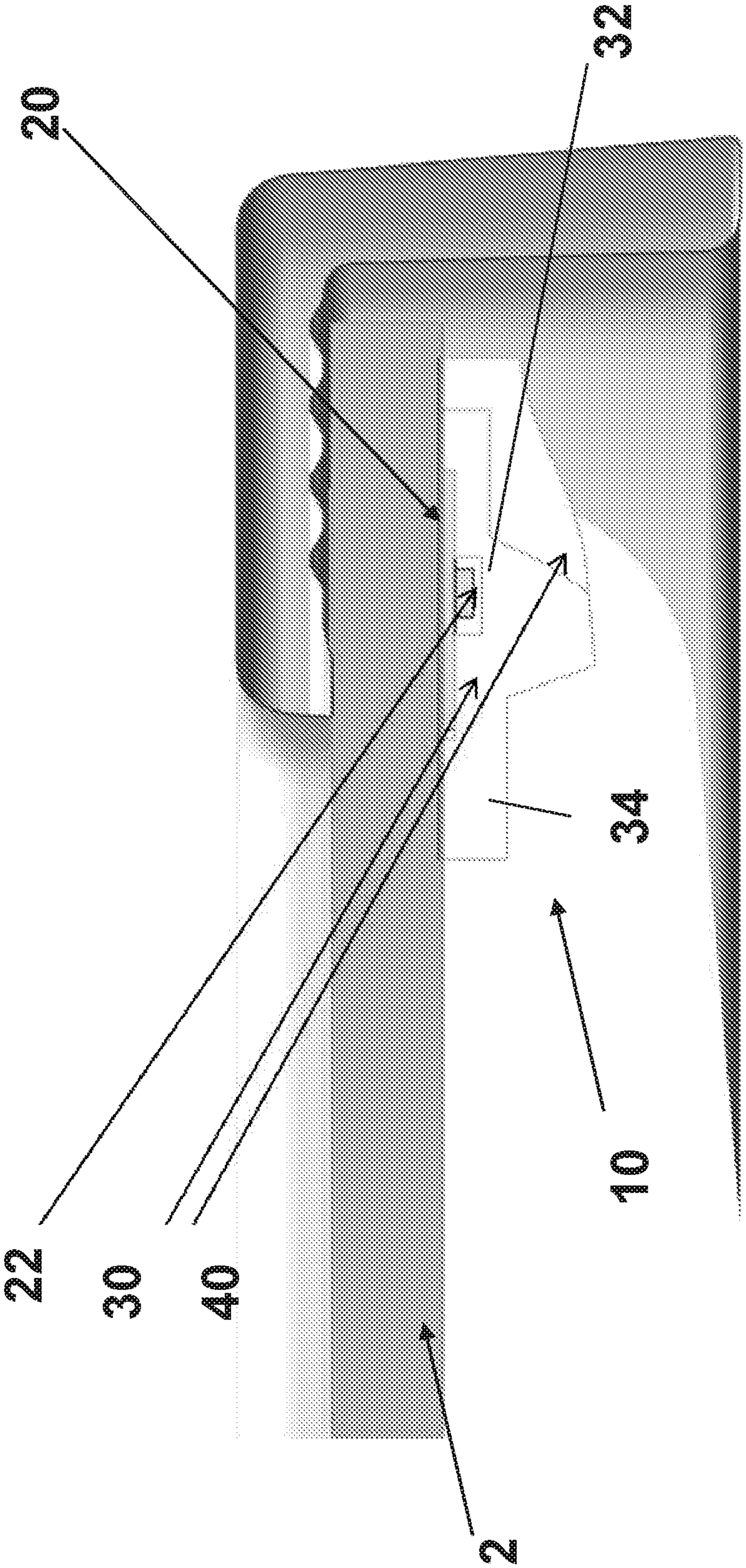
FIGS. 1 and 2 show a first embodiment of the luminaire of the present disclosure.

Referring to the drawings, and in particular FIG. 1, a luminaire of the present disclosure is shown and referred to as reference numeral 10. In FIG. 1, for ease of description, luminaire is shown as attached to the underside of a shelf 2. As discussed in greater detail below, luminaire 10 can be used in several different applications and configurations.

Luminaire 10 comprises printed circuit board (PCB) 20, lens 30, and housing 40. PCB 20 has a plurality of light sources, such as light-emitting diodes (LED) 22, along a length thereof. LEDs 22 can be in communication with a power source. When activated, LEDs 22 provide light to illuminate shelf 2. Lens 30 and housing 40 provide the optics that direct the light emitted from LEDs 22 back into shelf 2, or an interior of the space in which shelf 2 is installed. Housing can be sized and shaped so as to ensure a secure connection for luminaire 10 to shelf 2.

Figure 2:
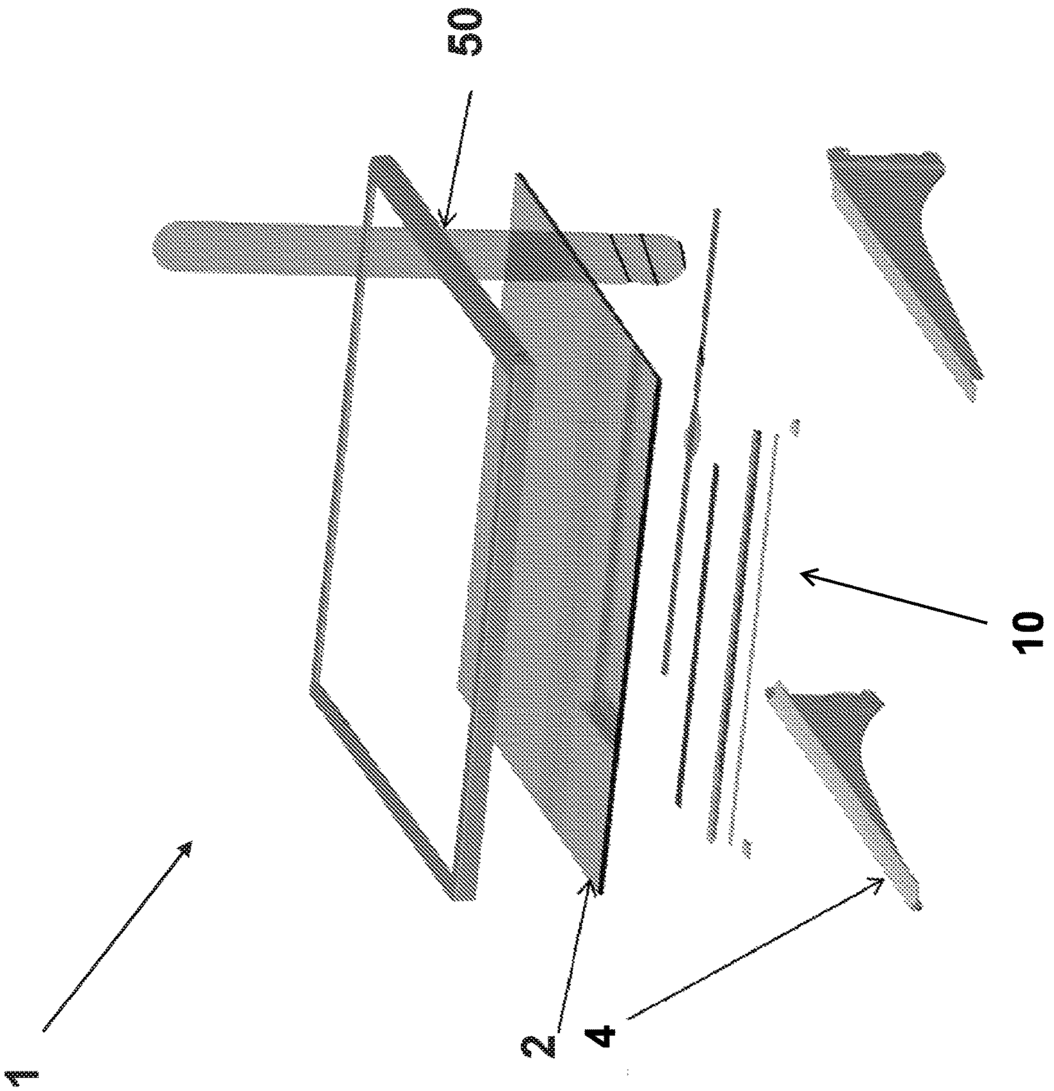
Figure 3:
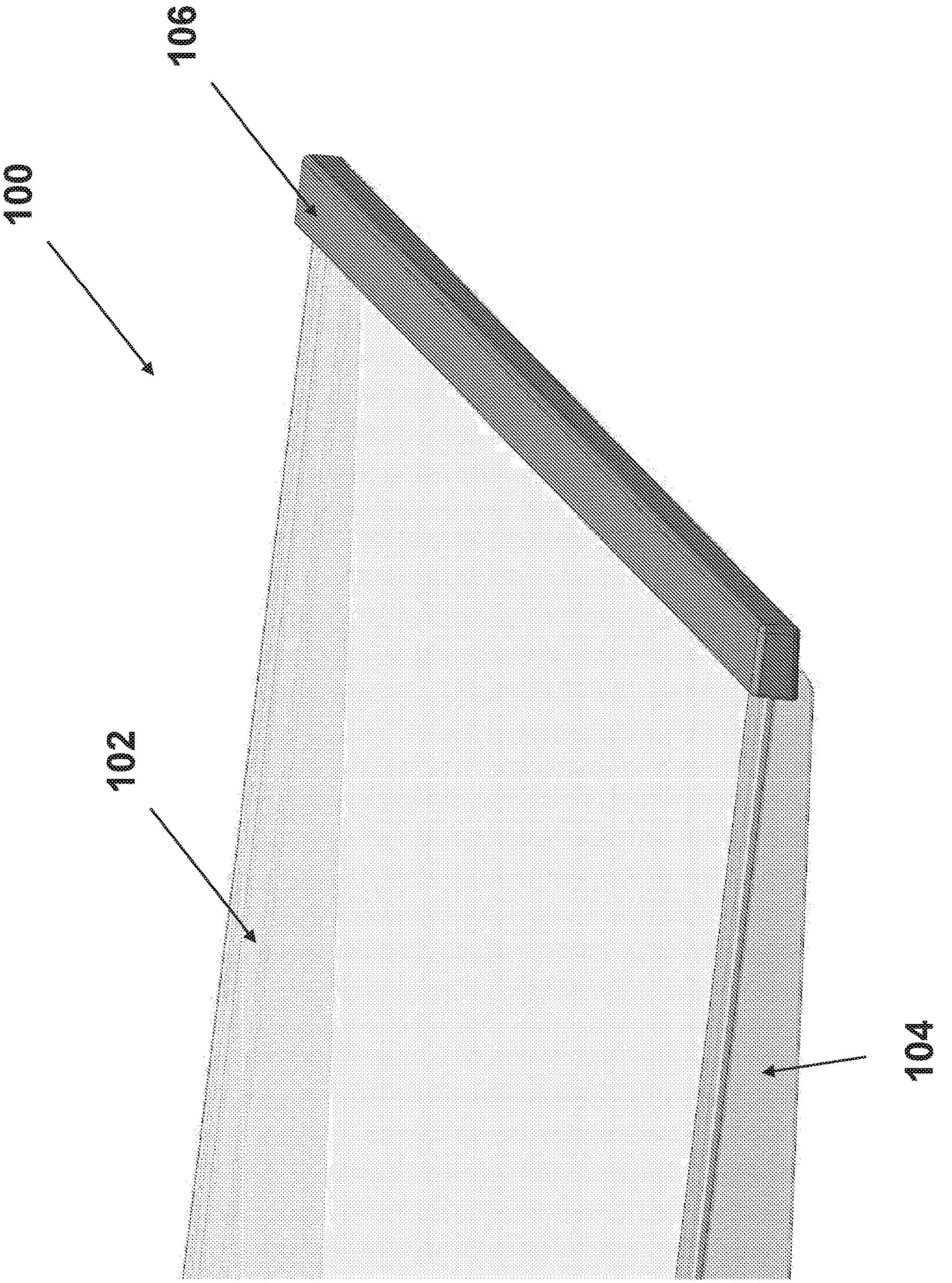
FIGS. 3-16*d* show a second embodiment of the luminaire of the present disclosure.
Figure 4:
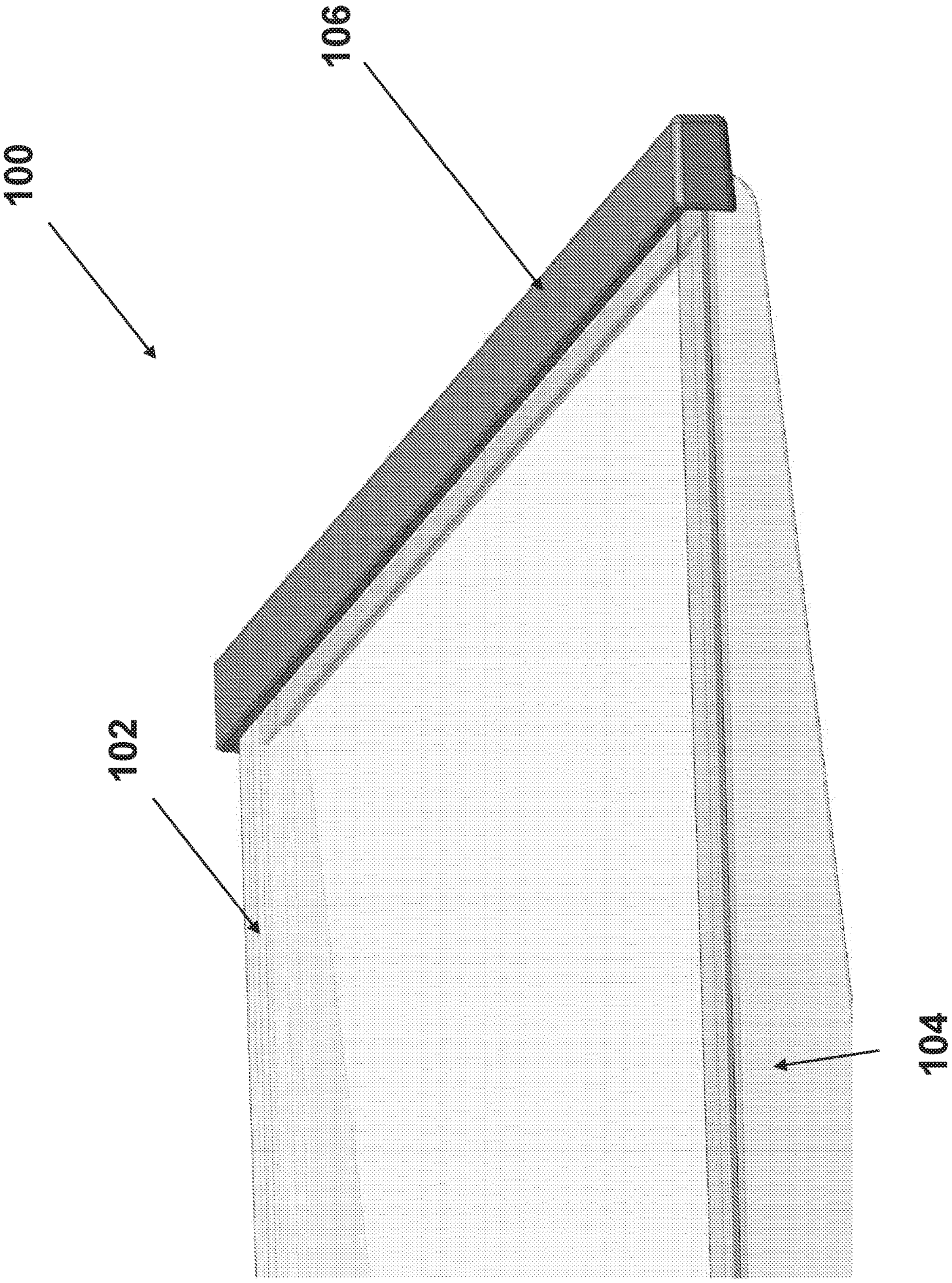
Figure 5:
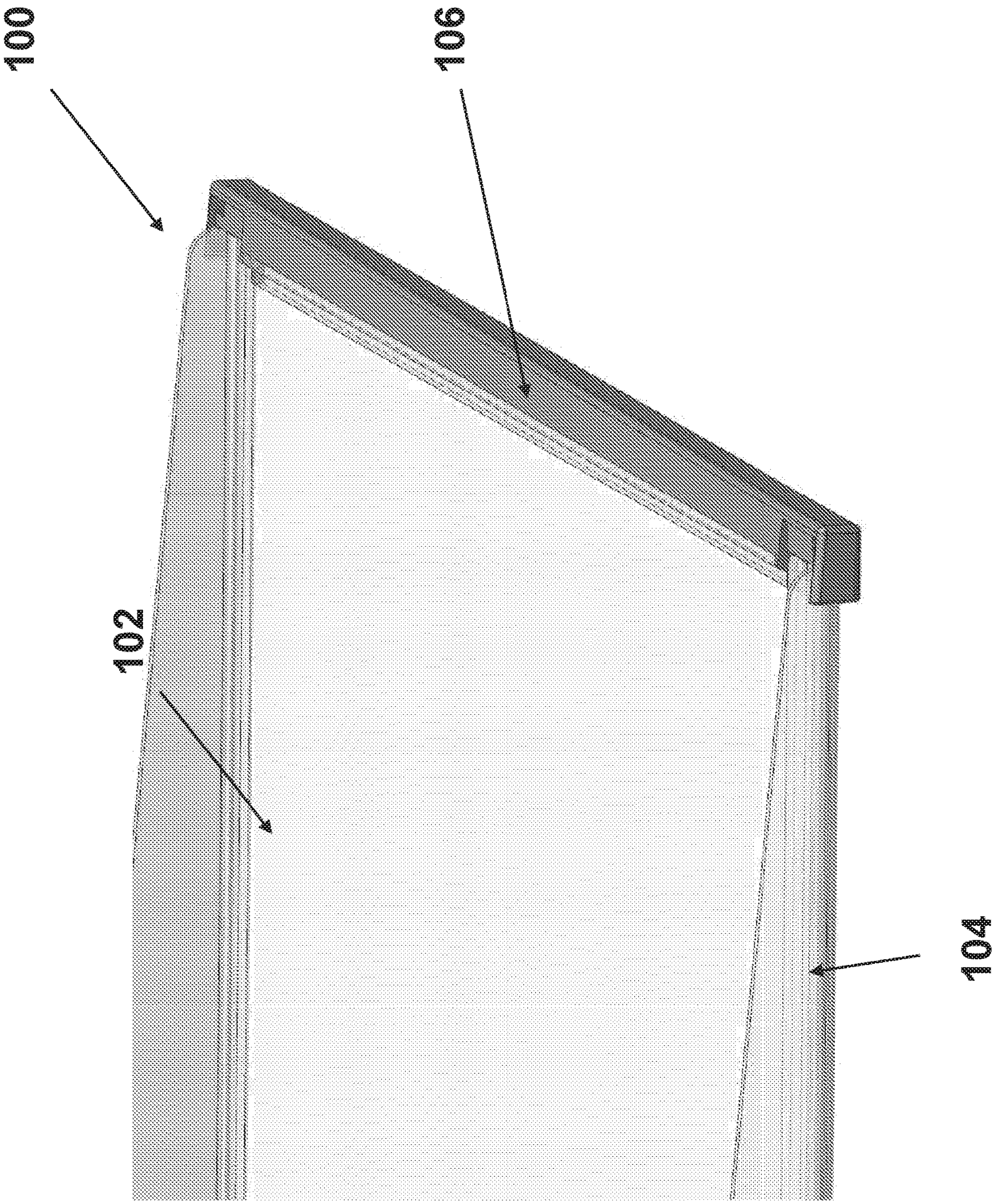
Figure 6:
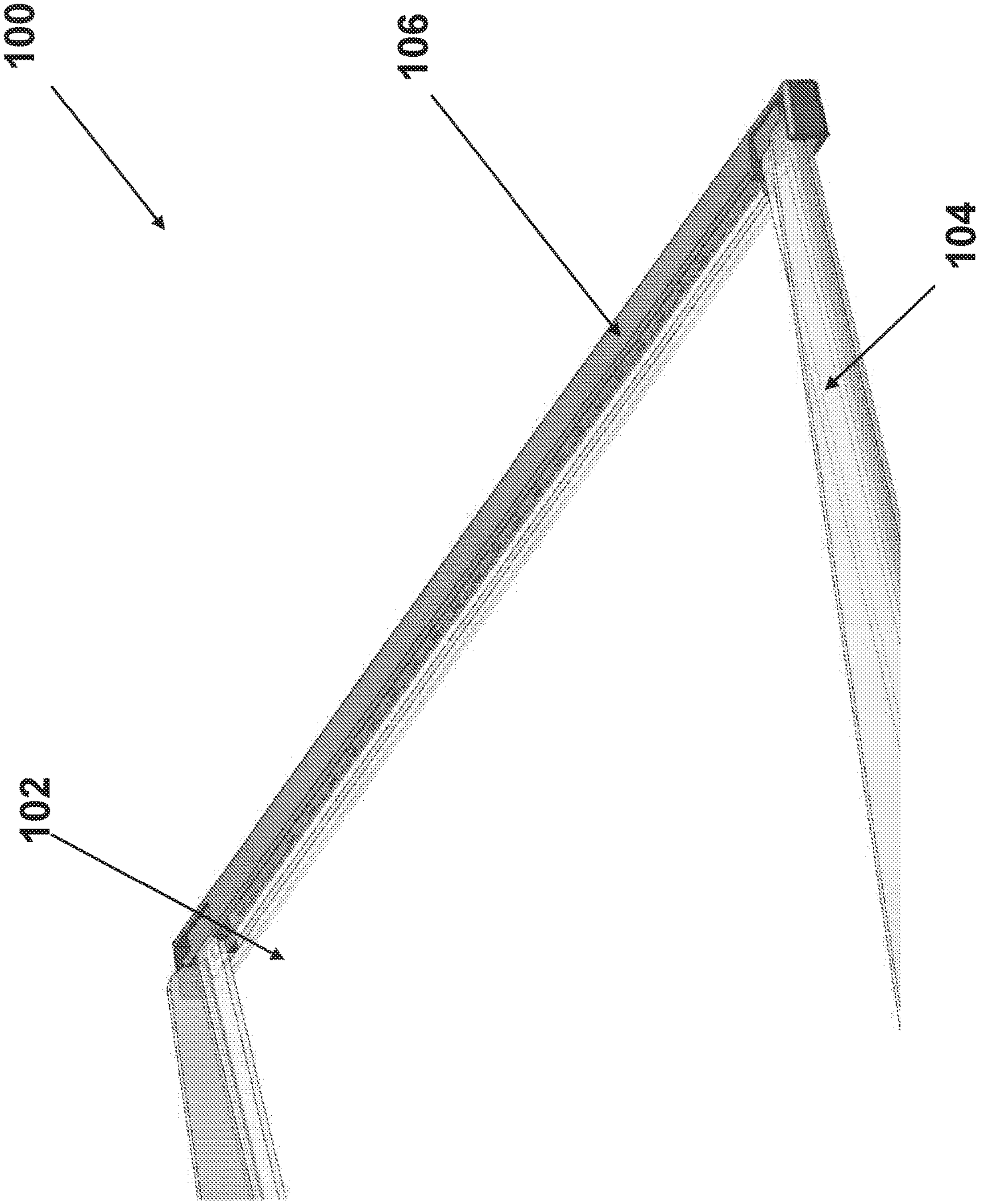

FIG. 2 shows an exploded view of luminaire 10 installed in a shelf assembly 1 that has panel 2 and side brackets 4. A power bus 50 can be at the rear of shelf assembly 1, to provide a power source to luminaire 10. Power to luminaire 10 can also be supplied through brackets 4, or with wires or leads that run along the length of panel 2 (not shown). Inductive power couplings could also be used to provide power to luminaire 10. Any of these power connections can be facilitated with a conductive compound, a mechanical interconnect feature, or a conductive material (not shown) that is located or sealed between brackets 4 and panel 2. The conductive material can be one-sided tape, a gasket material, or something else. Additional features, such as sealing elements or lubricants, can be added. These power arrangements and conductive materials are discussed in greater detail below.

Panel 2 and the panels of subsequent embodiments can be glass, metal, plastic, wood, or any other suitable structural material, which can be bonded or attached to the brackets 4. Panel 2 can be flat, or also have bent or curved edges. The bonding or attachment between panel 2 and brackets 4 can be with curable adhesives, two-sided pressure-sensitive adhesive or tape, other types of adhesives or tape, encapsulation, mechanical fasteners, or other methods. If panel 2 is made of a conductive material, e.g. metal, brackets 4 should be insulated from panel 2. The attachment medium between panel 2 and brackets 4 can then serve the dual purposes of connecting panel 2 and brackets 4 and also provided electrical isolation or insulation.

Brackets 4, as well as the brackets in any of the embodiments discussed below, can have a coating. This coating can provide decoration and resistance to corrosion. The coating also serves to insulate the metal of brackets 4 for the power being conducted through the brackets 4. The coating can be a powder coat, liquid paint, another type of paint, or other suitable coatings. As discussed in greater detail below, exposed or masked interconnect areas on brackets 4 at the point of connection to luminaire 10, as well as at a power source (e.g. bus 50), facilitate power conduction.

In luminaire 10, and all of the additional embodiments discussed below, the PCB (in this embodiment PCB 20) can be connected to a substrate, such as panel 2, with curable adhesives, two-sided pressure-sensitive adhesive or tape, other types of adhesives or tape, encapsulation, mechanical fasteners, or other methods. These connection methods can provide the double function of sealing PCB 20 from the environment, electro-static discharge (ESD), contamination, or human touch, and structurally attaching PCB 20 to the substrate.

One way to achieve the sealing and connection functions discussed immediately above is by using lens 30 to connect or enclose PCB 20 to shelf panel 2. Referring to FIG. 1, lens 30 can have a groove 32 and a lip 34. PCB 20 can be within groove 32 when PCB 20 is connected to or enclosed to panel 2. Lip 34 surrounds PCB 20 and contacts panel 2 as well. In this manner, lens seals PCB 22 off from outside contaminants as described above. Lens 30 thus doubles as a structural element that provides protection to PCB 20 and directs light emanating therefrom as well.

Luminaire 10 is modular with a slim profile. Thus, luminaire 10 can be adapted into several types of drawer and shelf configurations. It is also easy to assemble and inexpensive, due to the simplified construction. In some embodiments, discussed in further detail below, luminaire 10 is integrated into a shelf so that the shelf or a shelf frame itself serves the function of lens 30 or housing 40, thus eliminating the need for one or both of these components. These features distinguish the luminaires of the present disclosure over those of the prior art. The latter often require cumbersome housing assemblies with additional components such as fasteners, all of which have to be attached to or surround the glass shelf panel. This adds significantly to the profile or size of the final shelf assembly. With the luminaires of the present disclosure, by contrast, the overall profile or dimensions of the shelf assembly is not significantly altered. Moreover, as discussed in greater detail below, they can be easily adapted for many different types of applications.

Referring to FIGS. 3-16*d*, a shelf assembly 100 utilizing a second embodiment of the luminaire of the present disclosure, referred to with reference numeral 110, is shown. In FIGS. 3-16*d*, luminaire 110 is encapsulated into the framework of shelf assembly 100. Shelf assembly 100 has panel 102, side brackets 104, and front frame 106. The individual components of luminaire 110 are shown throughout FIGS. 3-16*d*, and the fully assembled luminaire 110 is shown in detail in FIGS. 13 and 16*a*.

Figure 7:
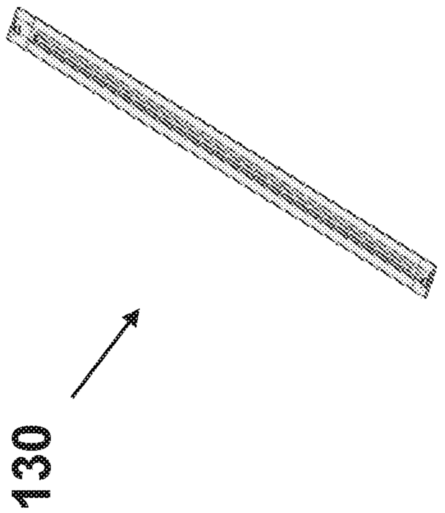
Figure 8:
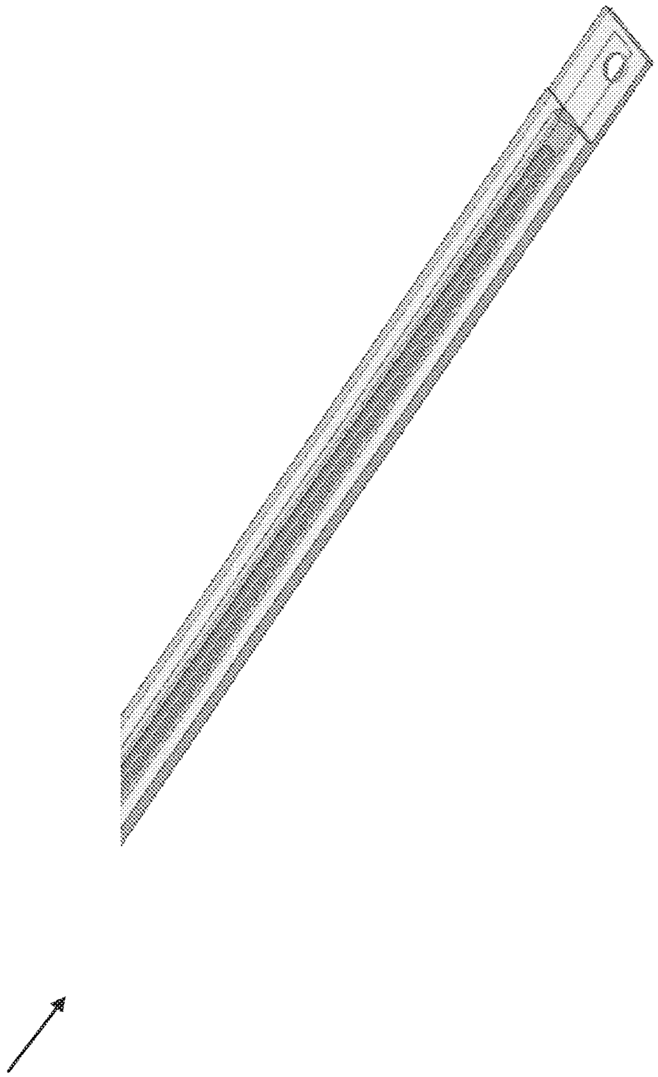
Figure 10:
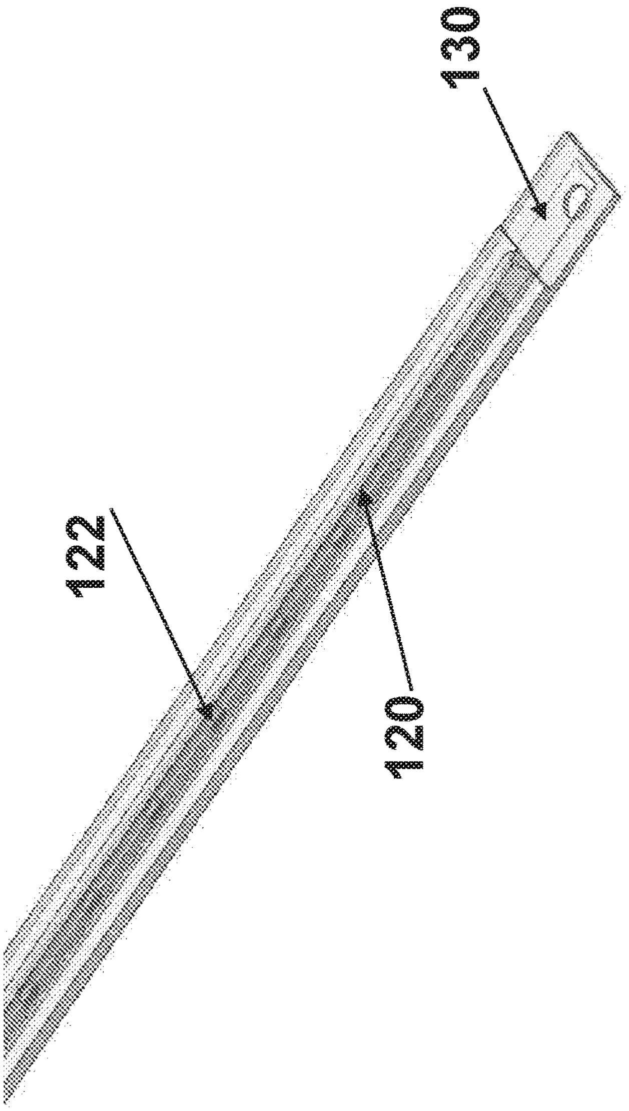
Figure 11:
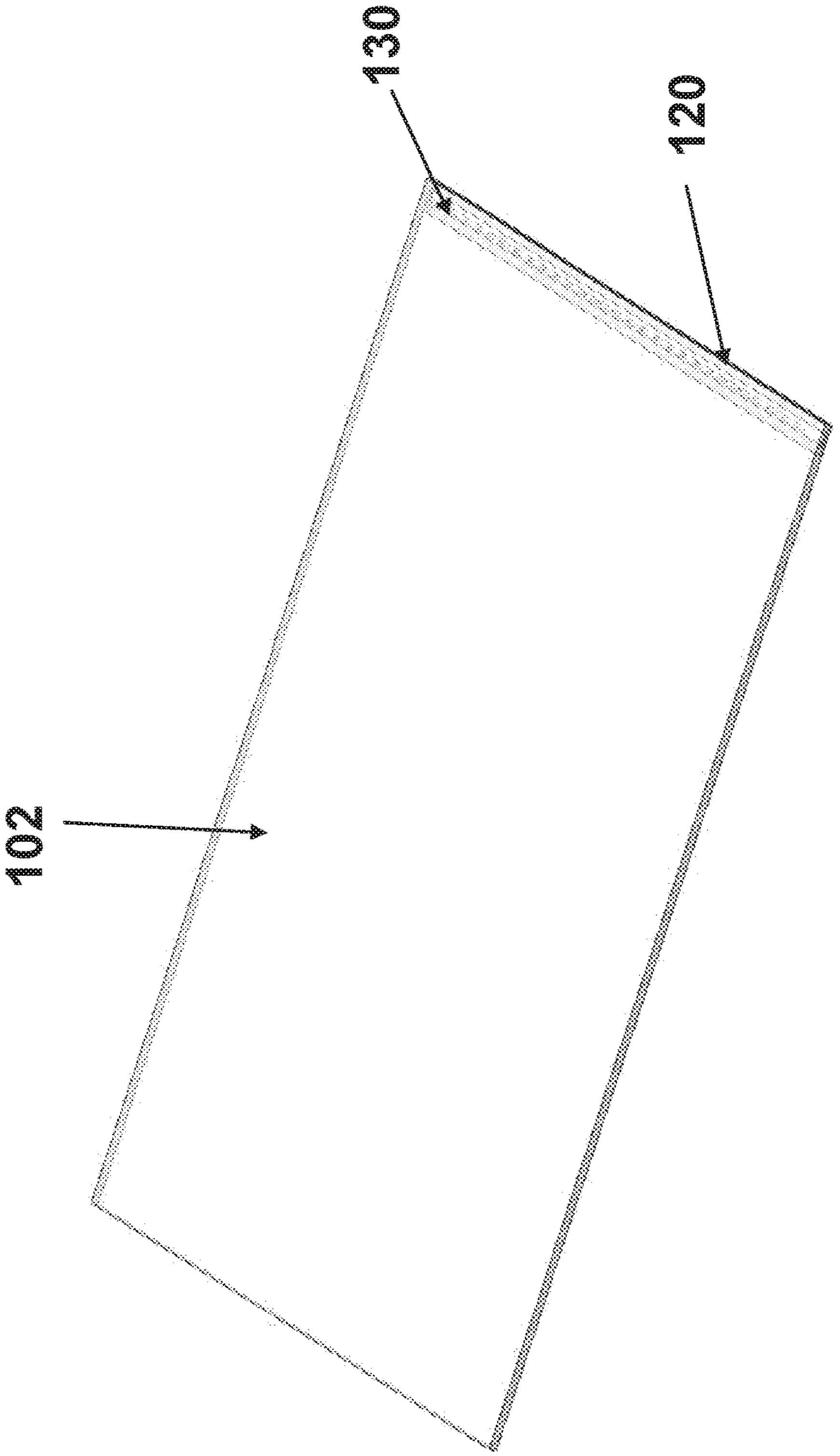
Figure 12:
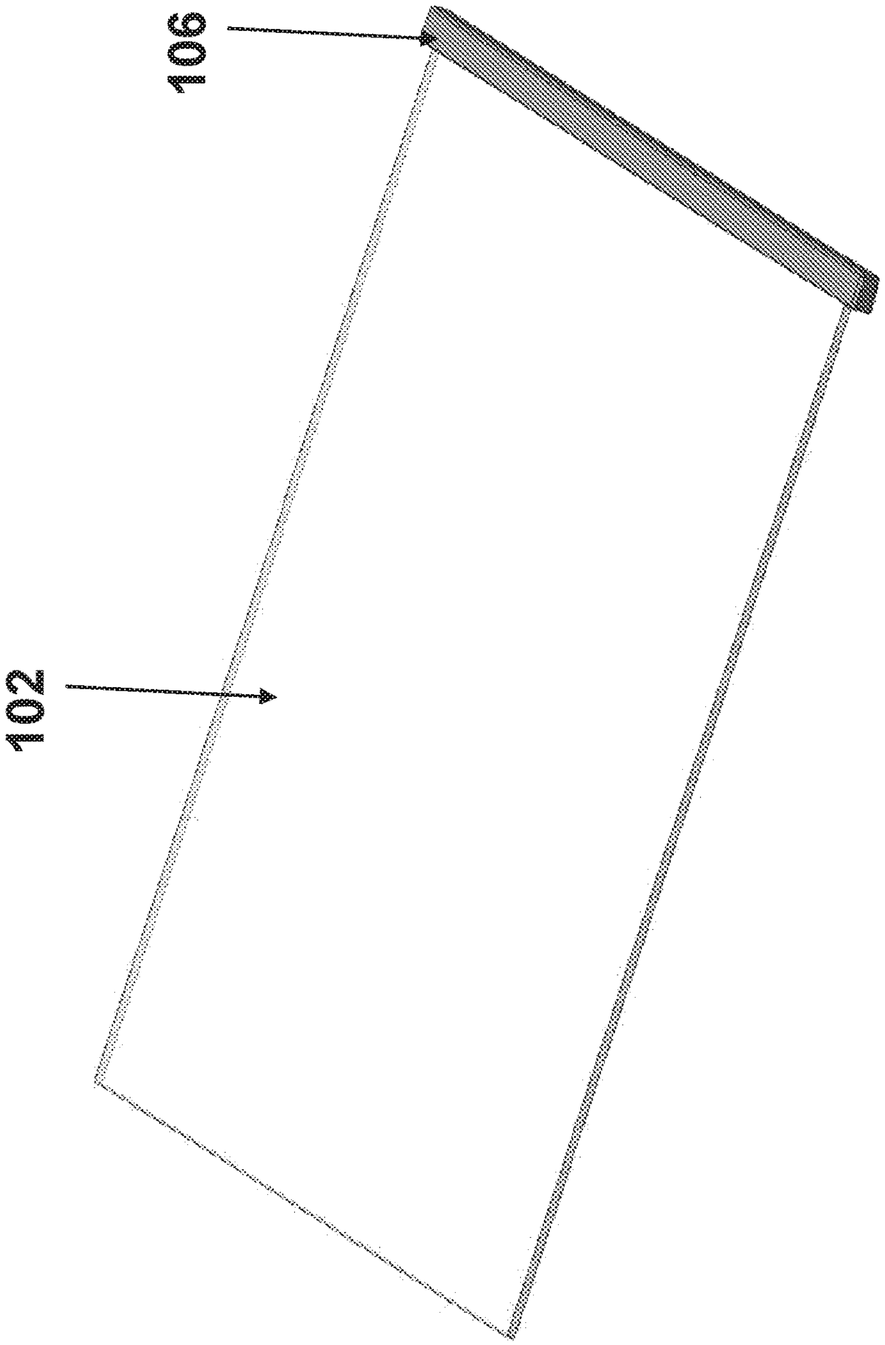
Figure 13:
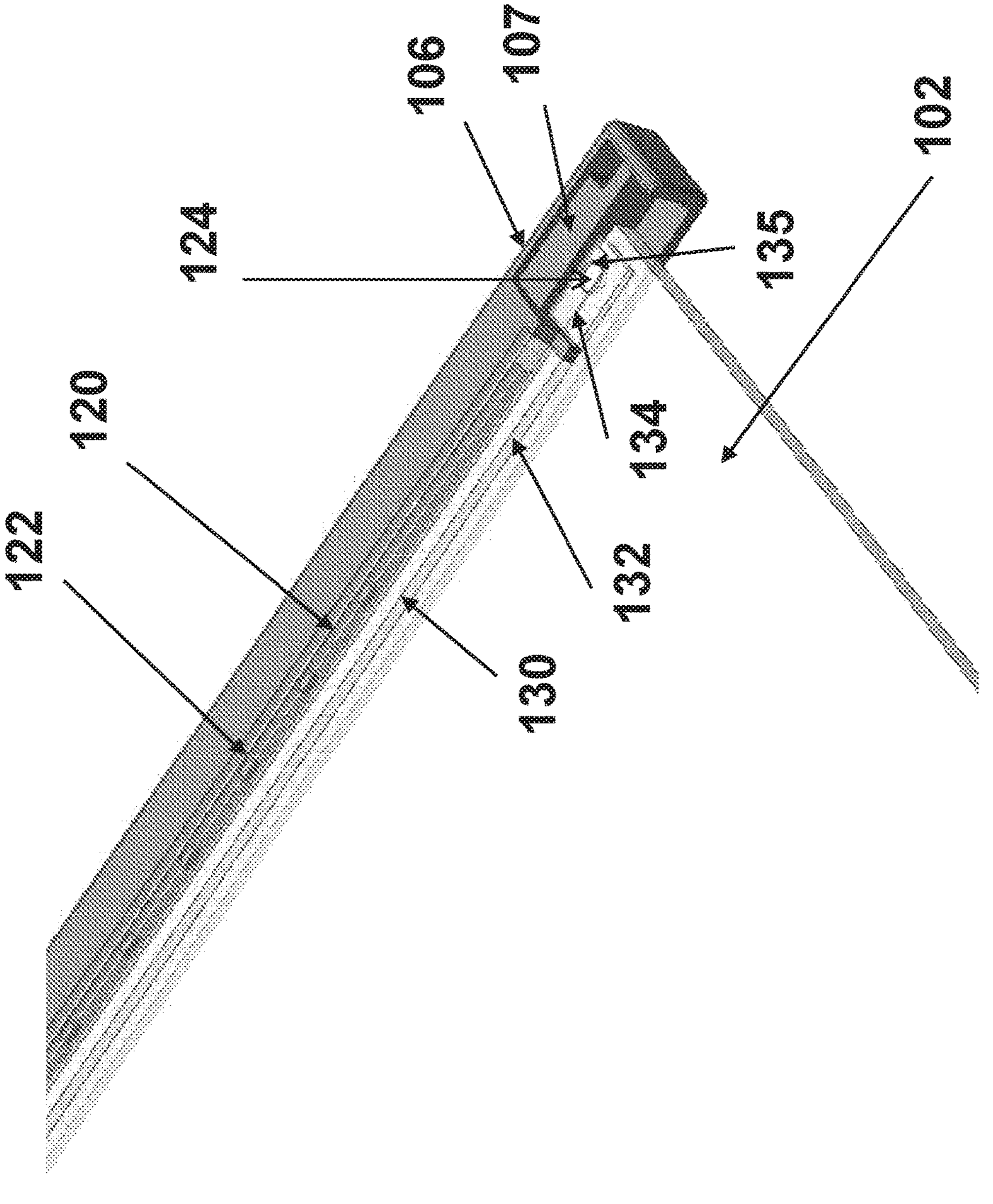
Figure 14:
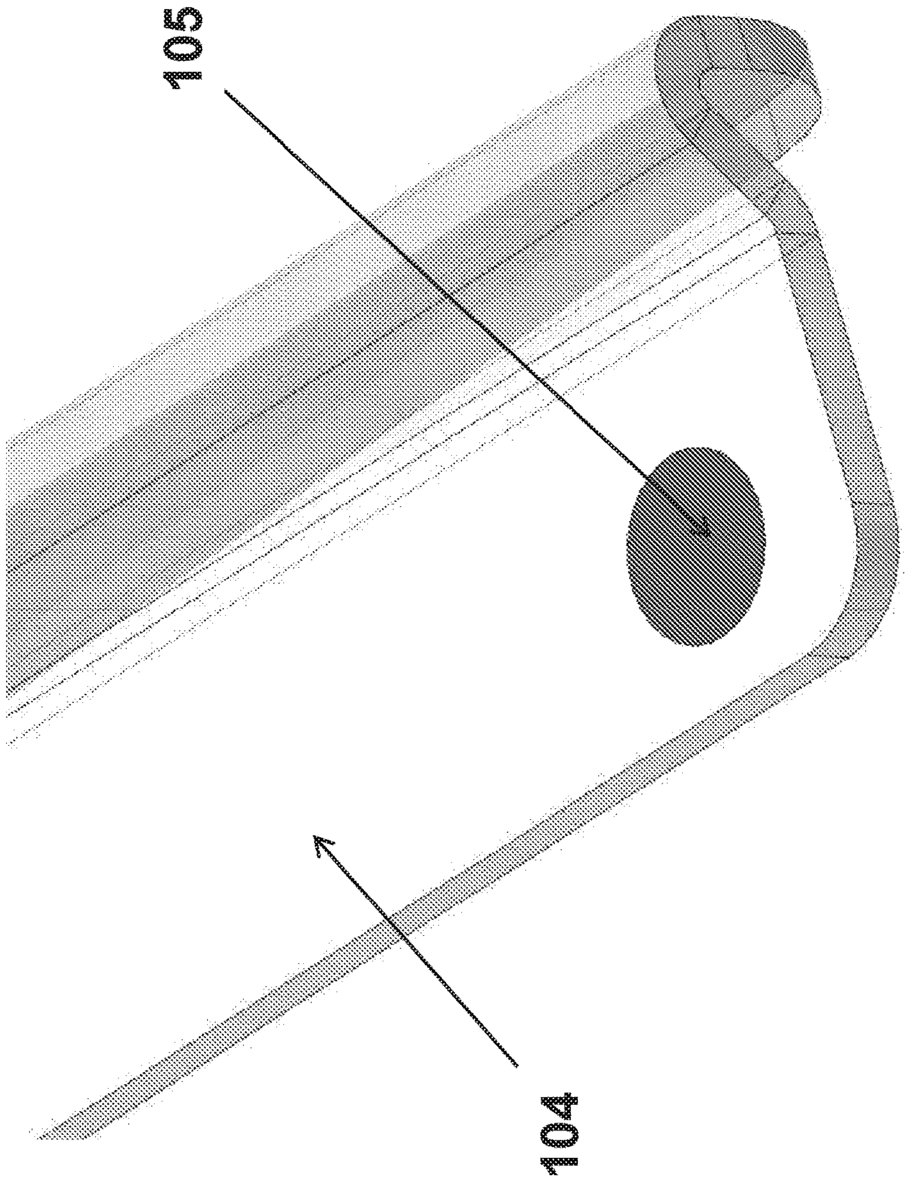

Referring to FIGS. 7-8, luminaire 110 has lens 130, which can be molded from a material, for example polymethyl methacrylate (PMMA). As shown in FIG. 10, PCB 120 can be affixed to lens 130 with an adhesive, such as a pressure-sensitive adhesive or a double-sided adhesive. Other methods of retaining or connecting PCB 120 to lens 130 could be employed, including physical retention features such as snaps or hooks, as well as inserting or overmolding PCB 120 into lens 130. As shown in FIGS. 11 and 13, the assembly of PCB 120 and lens 130 is affixed to panel 102 with an adhesive (e.g., a UV-curable, heat-curable, moisture-curable, conductive, double-sided, or pressure-sensitive adhesive), along a front edge thereof. Next, as shown in FIGS. 12 and 13, the front frame 106 is overmolded or encapsulated onto the front edge of panel 102, where PCB 120 and lens 130 are connected.

In the embodiment of a shelf assembly 100 shown in FIGS. 3-16*d*, luminaire 110 is integrally formed with shelf assembly 100. As discussed above, this has significant advantages in terms of cost and assembly, as components can be eliminated. Specifically, luminaire 110 does not require a housing, as in luminaire 10. Rather, front frame 106 doubles as a frame for the shelf assembly 100 and as a housing to secure PCB 120 and lens 130 in place. In this and other embodiments, frame 106 can also provide reflection of light emanating from PCB 120 or be coated with a reflective surface. Frame 106 could also double as lens 130, if a clear frame material were used. A clear frame 106 could have a metal film applied for reflective purposes. Furthermore, although frame 106 is described as encapsulating luminaire 110, frame 106 can also be snap assembled or bonded to the panel 102.

Figure 9:
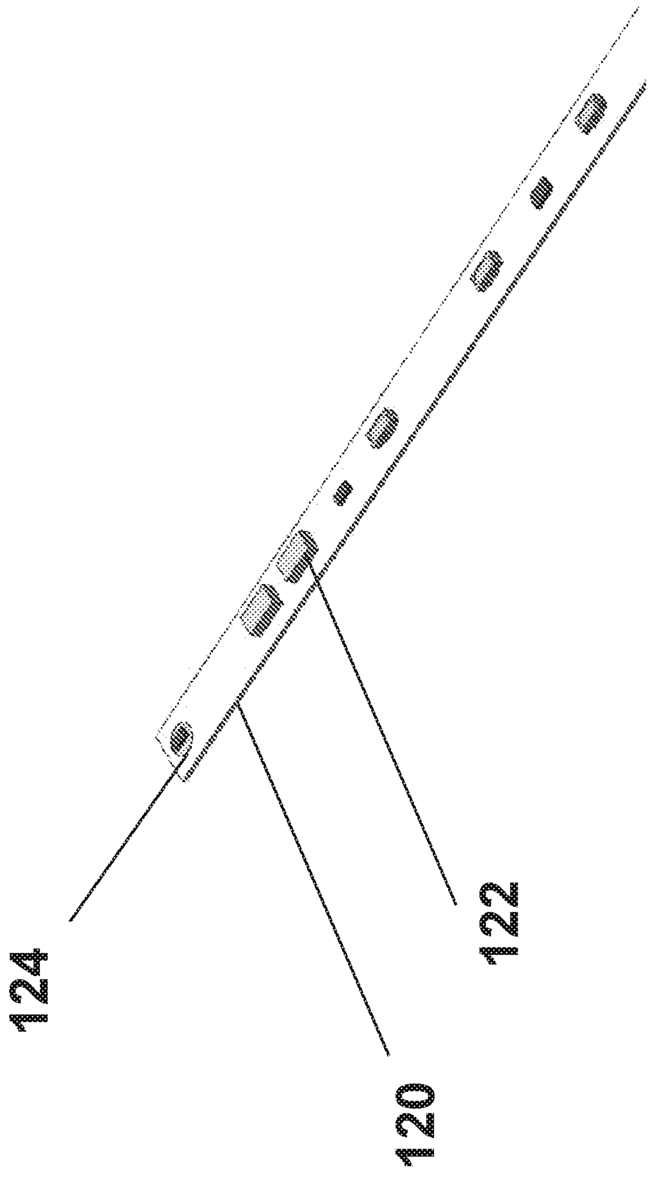

As shown in FIG. 9, PCB 120 can have an arrangement of LEDs 122 thereon. LEDs 122 provide illumination for shelf assembly 100 and are scattered, diffused, or reflected with lens 130 and/or frame 106. PCB 120 also has interface 124. Interface 124 is an area of PCB 120 that places LEDs 122 in electrical connection with a power source, as described in greater detail below. Interface 124 can be a metal contact, flat or raised, or a conductive tape, liquid, or foam, or any conductive component affixed or integrated with PCB 120. Any material that effects or facilitates the electrical power connection is suitable.

As shown in FIG. 13, lens 130 can have a main region 132 and a second region 134. Main region 132 covers and protects PCB 120 when assembly 100 is installed, and is made of an insulating material. Second region 134 is designed to cover interface 124 of PCB 120, and thus can have a flatter profile. Second region 134 can have an aperture 135 to leave an open space for interface 124. In one embodiment, second region 134 is made of an insulating material, similarly to main region 132. Alternatively, second region 134 can be made from a conductive material to effect the electrical connection between interface 124 and the power source. The conductive materials for second region 134 can be a conductive plastic, tape, liquid, gel, foam, or combinations thereof.

Luminaire 110 can also have an additional contact pad (not shown) to facilitate and maintain the connection between interface 124, lens 130, and a power source. The contact pad can be made of a conductive compound, such as solder or other conductive liquids, gels, or tapes. The contact pad can be connected to or applied to any or all of brackets 104, lens 130, or PCB 120. The contact pad can be used when second region 134 is conductive or insulating.

Figure 15:
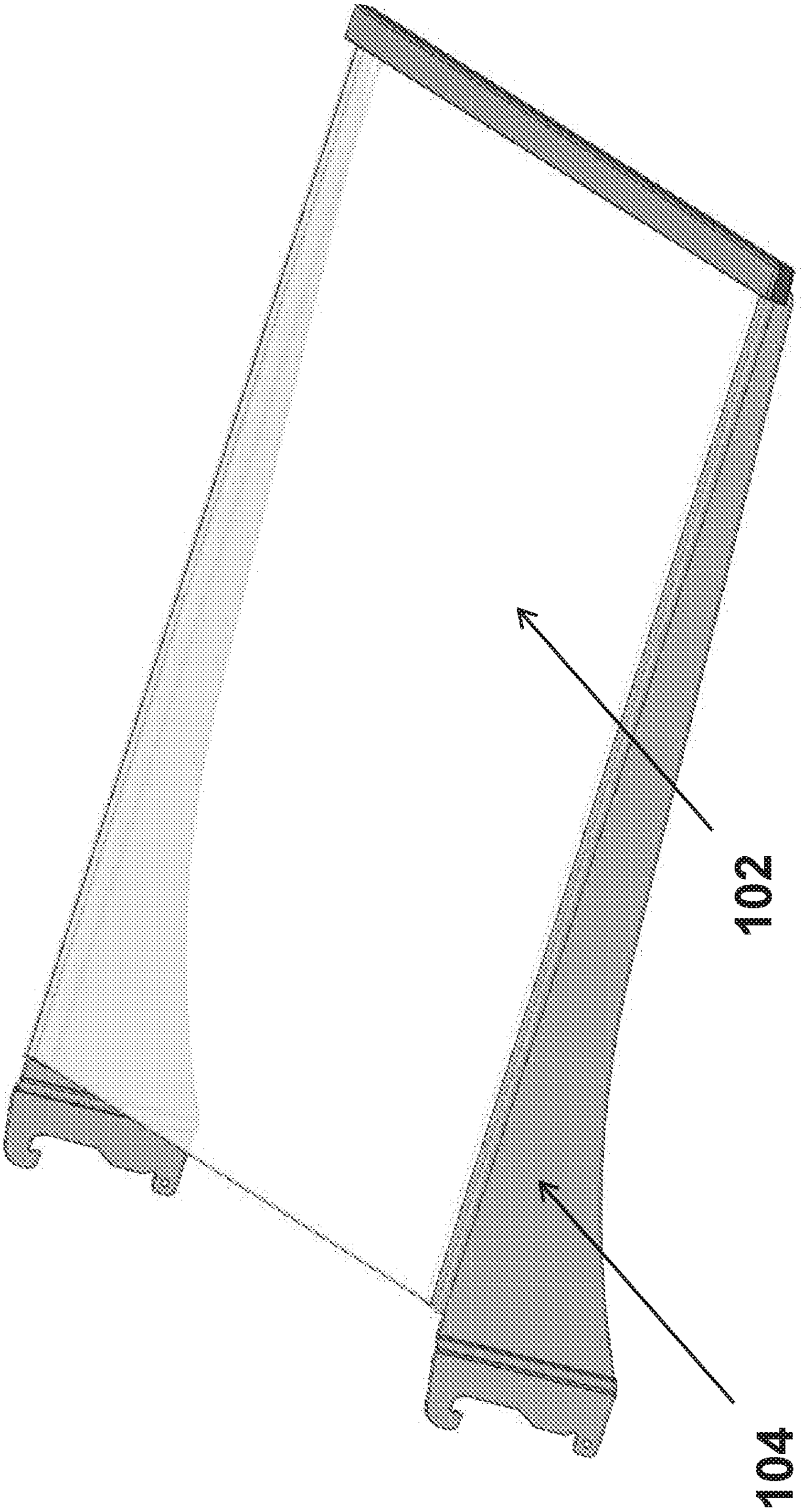
Figure 16A:
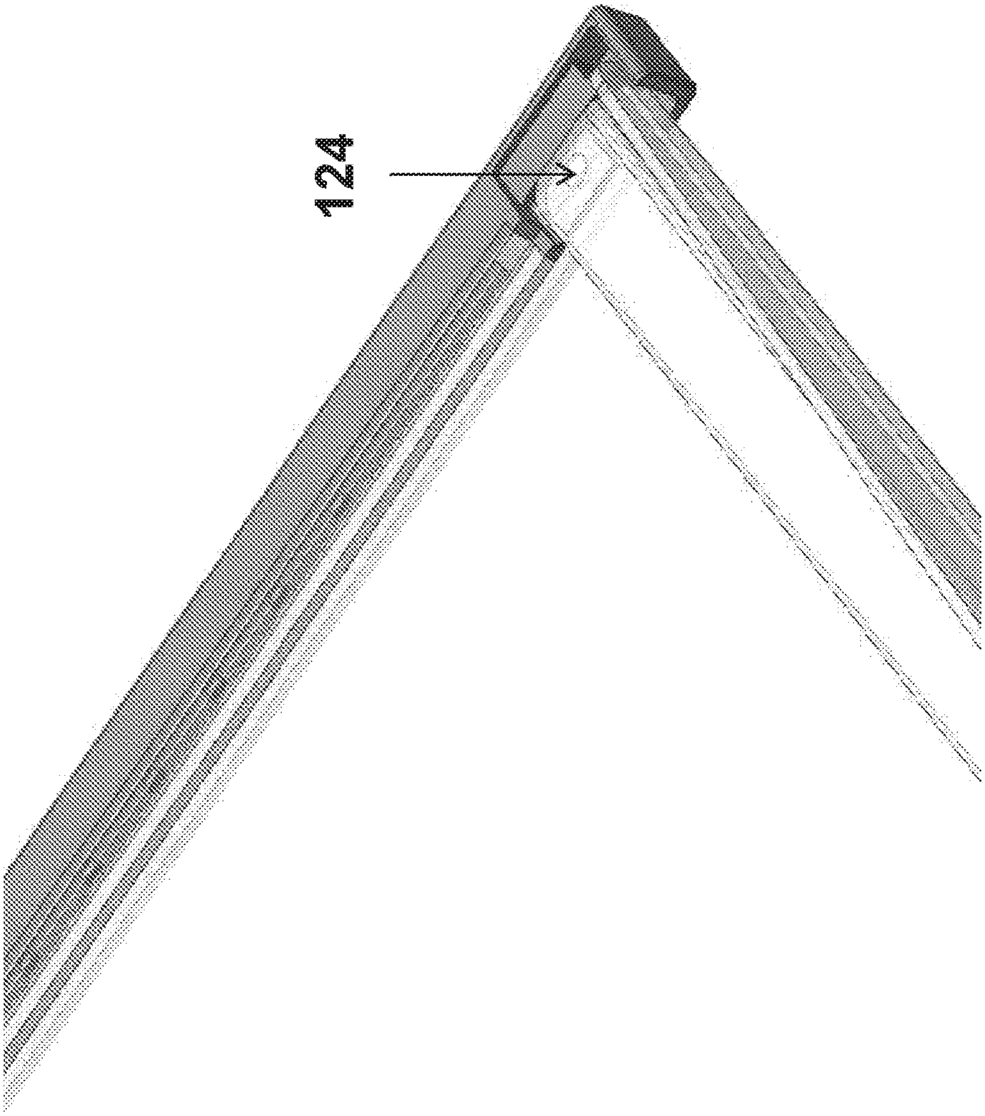
Figure 16B:
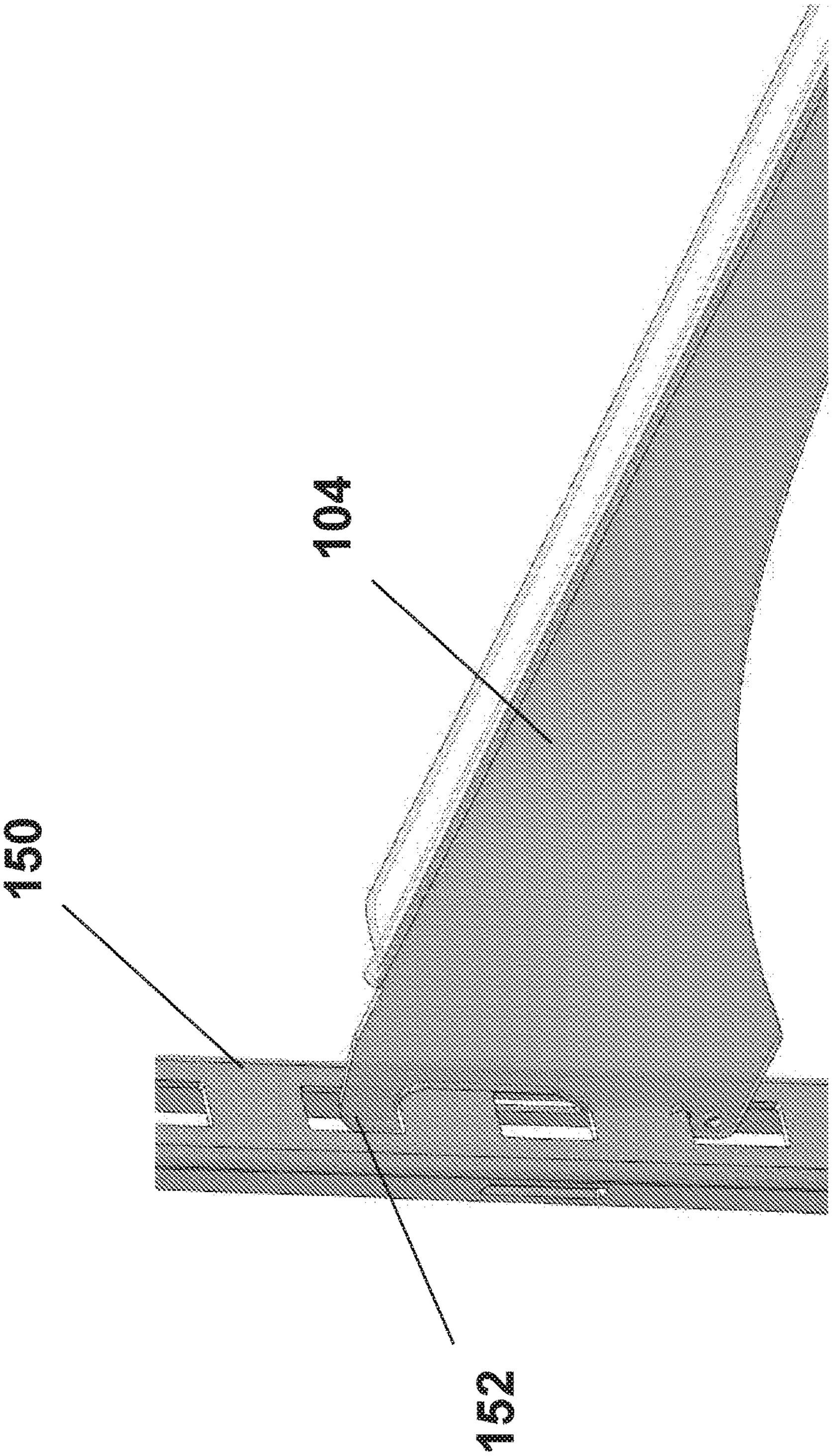

As shown in FIG. 13, frame 106 can have a gap 107 on an underside thereof through which interface 124 on PCB 120 can be accessed. Thus, when shelf assembly 100 is put together by adhering brackets 104 to panel 102 as shown in FIGS. 15, 16*a*, and 16*b*, a conductive area 105 (shown in FIG. 14) on side brackets 104 contacts interface 124 through the contact pad. If brackets 104 are powder coated or otherwise insulated, area 105 is an exposed conductive area, to ensure a proper power connection with interface 124. It is through this connection that the LEDs 122 on PCB 120 are powered for illumination.

Figure 16C:
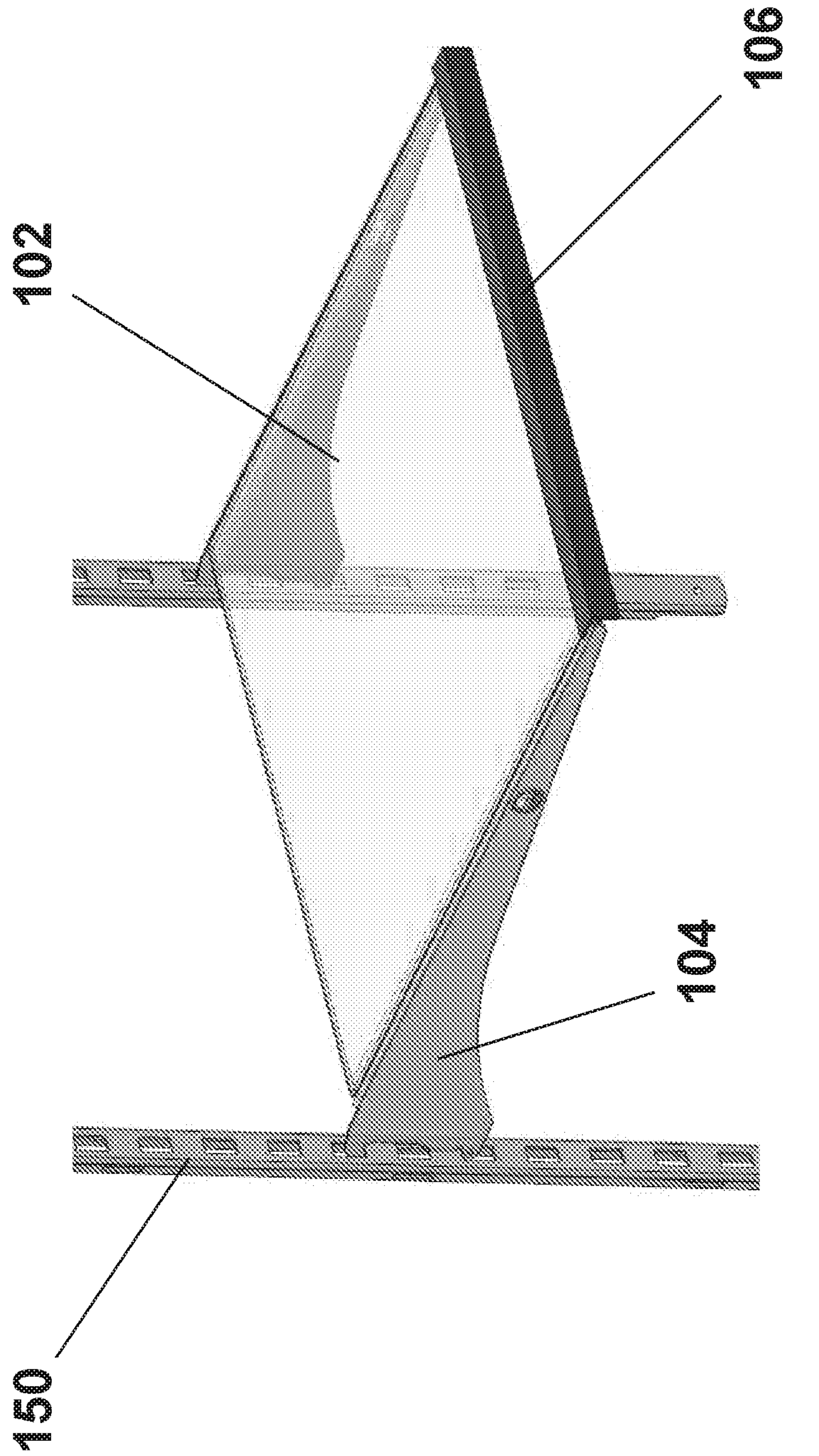
Figure 16D:
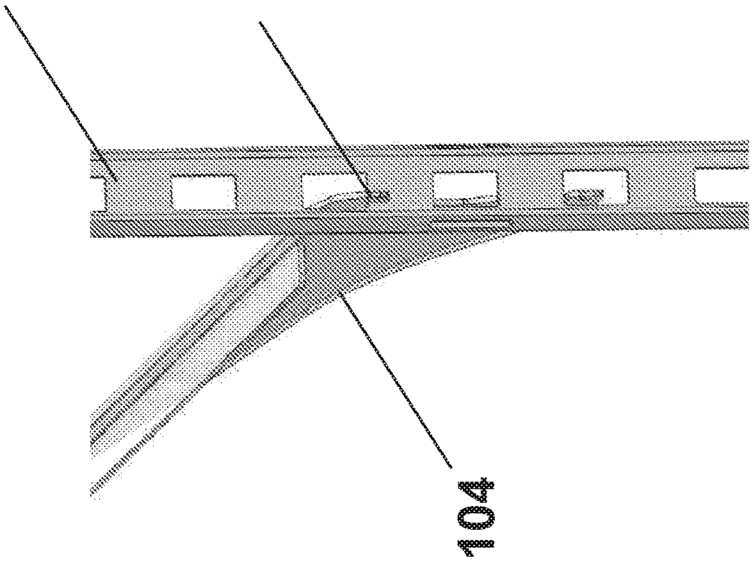
Figure 17:
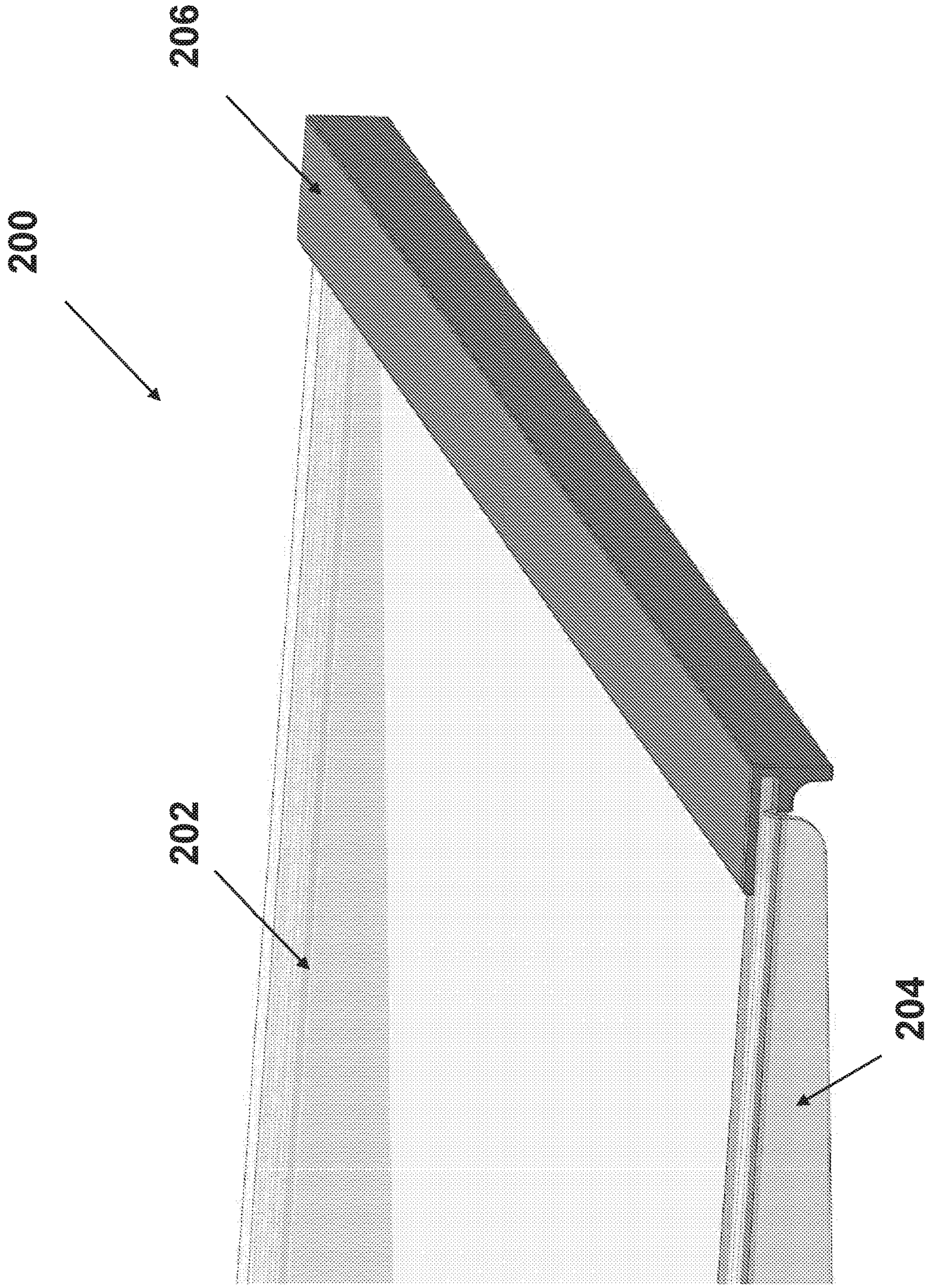
FIGS. 17-35 show a third embodiment of the luminaire of the present disclosure.
Figure 18:
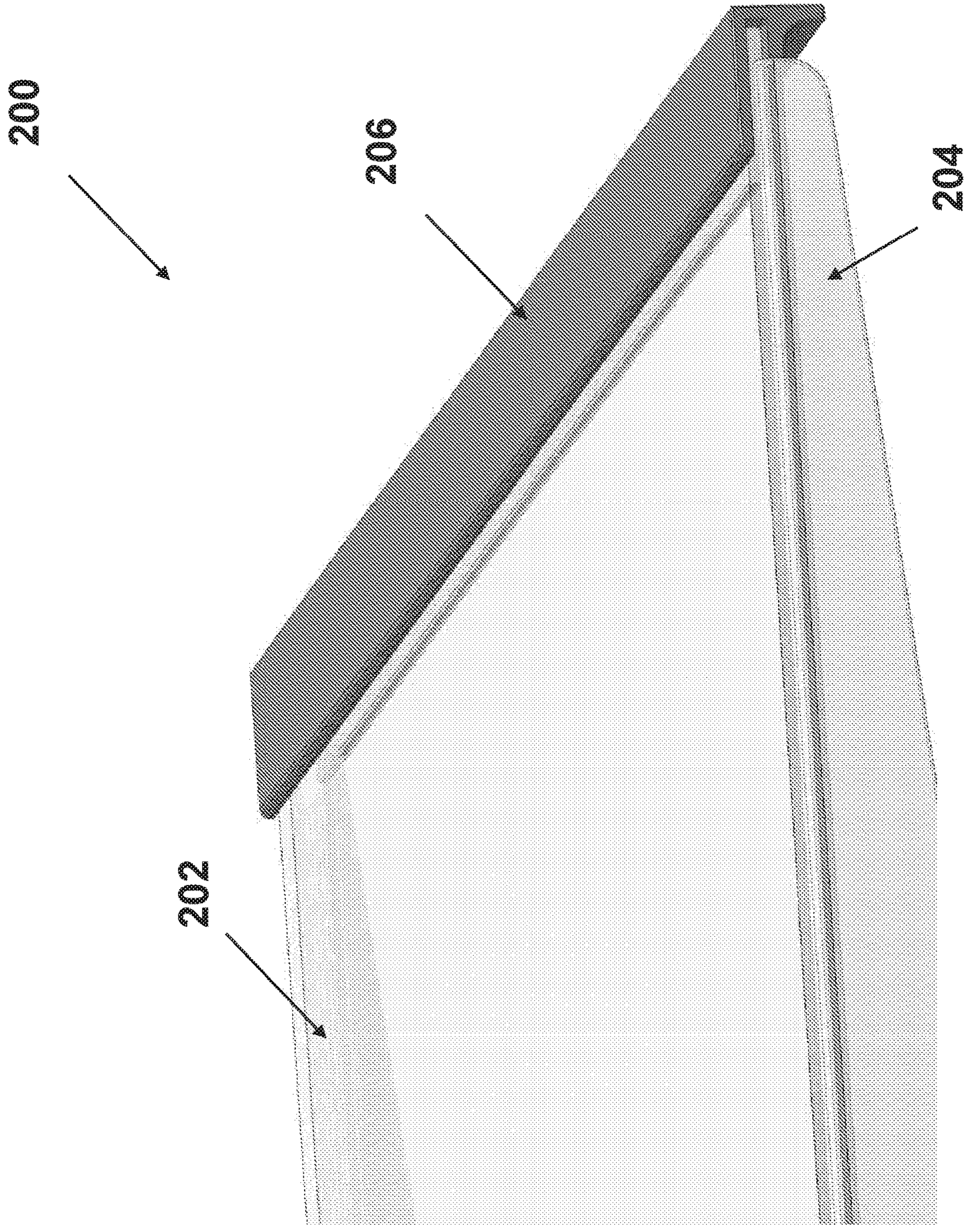
Figure 19:
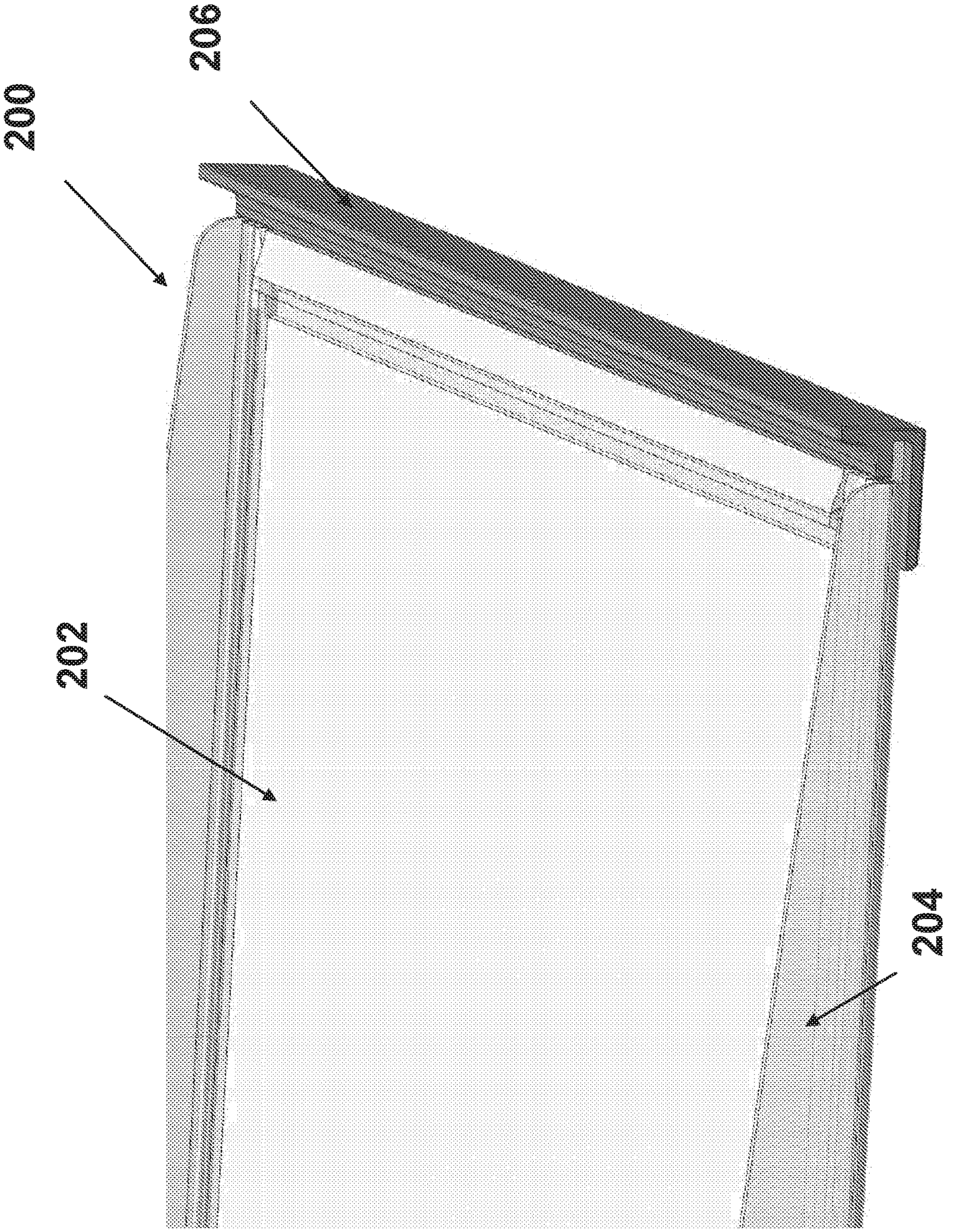
Figure 20:
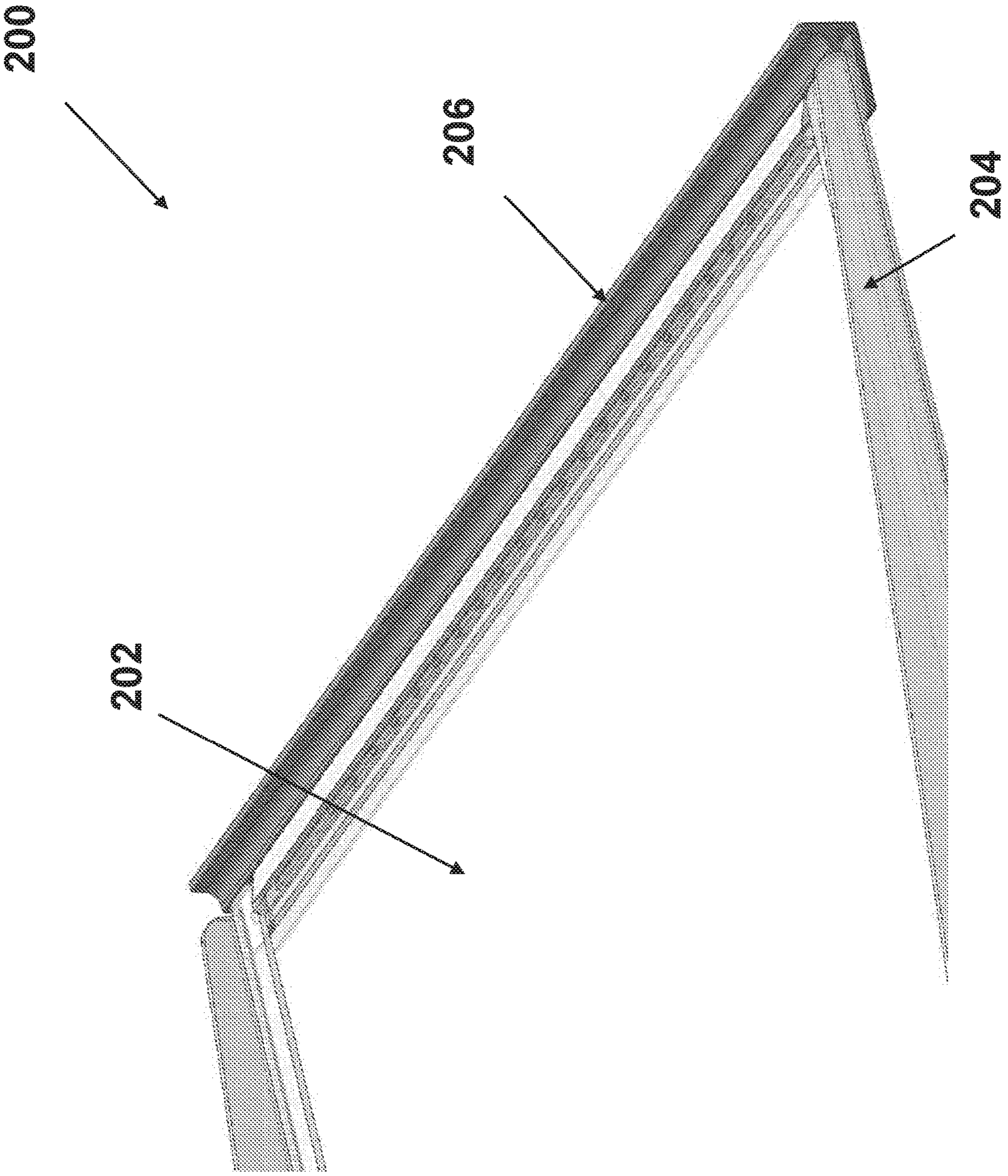
Figure 21:
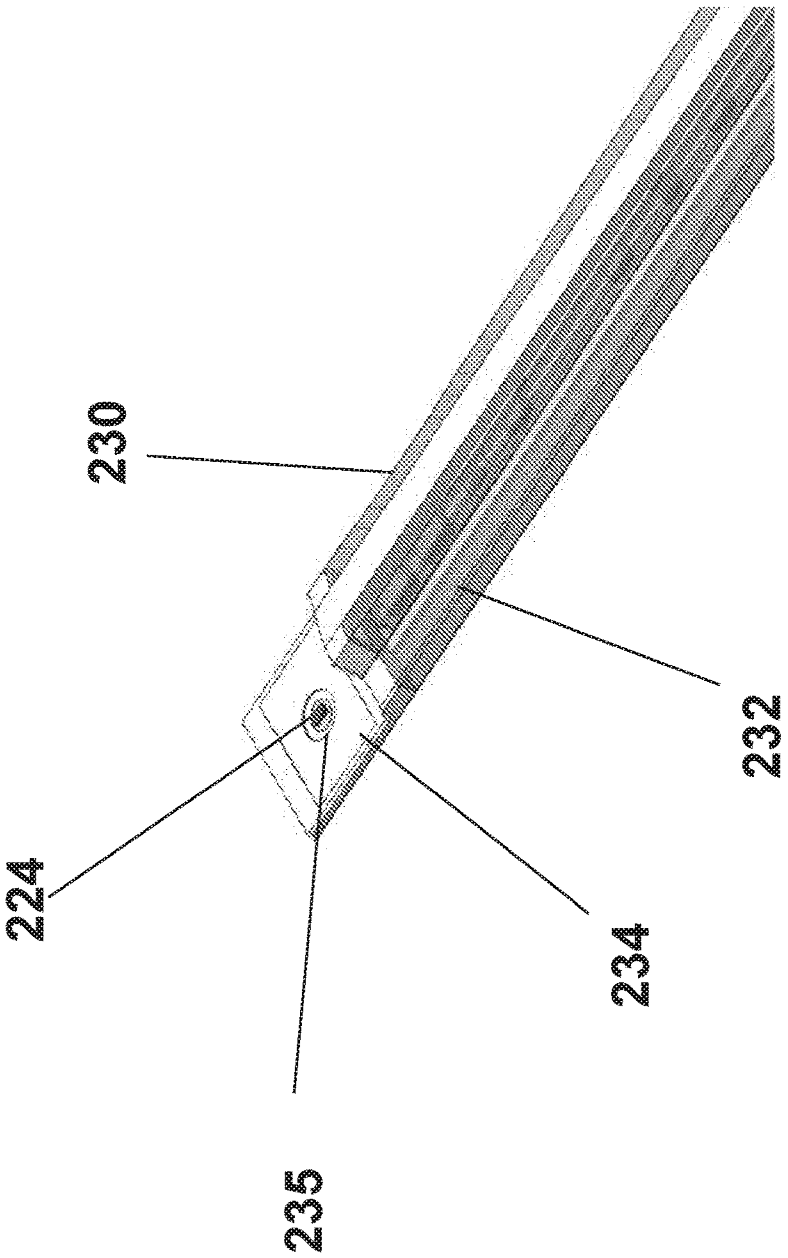

As shown in FIGS. 16*b*-16*d*, brackets 104 can connect to support rails 150. Again, if brackets 104 are coated or insulated, they can have exposed conductive areas at the point of connection 152 to rails 150. This point of connection 152 allows power to be transmitted from a source (not shown) through brackets 104 and to PCB 120, through the connection described above. There can be an additional pad, clip, or covering (not shown) surrounding brackets 104 at point of connection 152. This pad, clip, or covering would maintain the connection between shelf 104 and rails 150 in the event that either one is shaken or moves during use.

Figure 25:
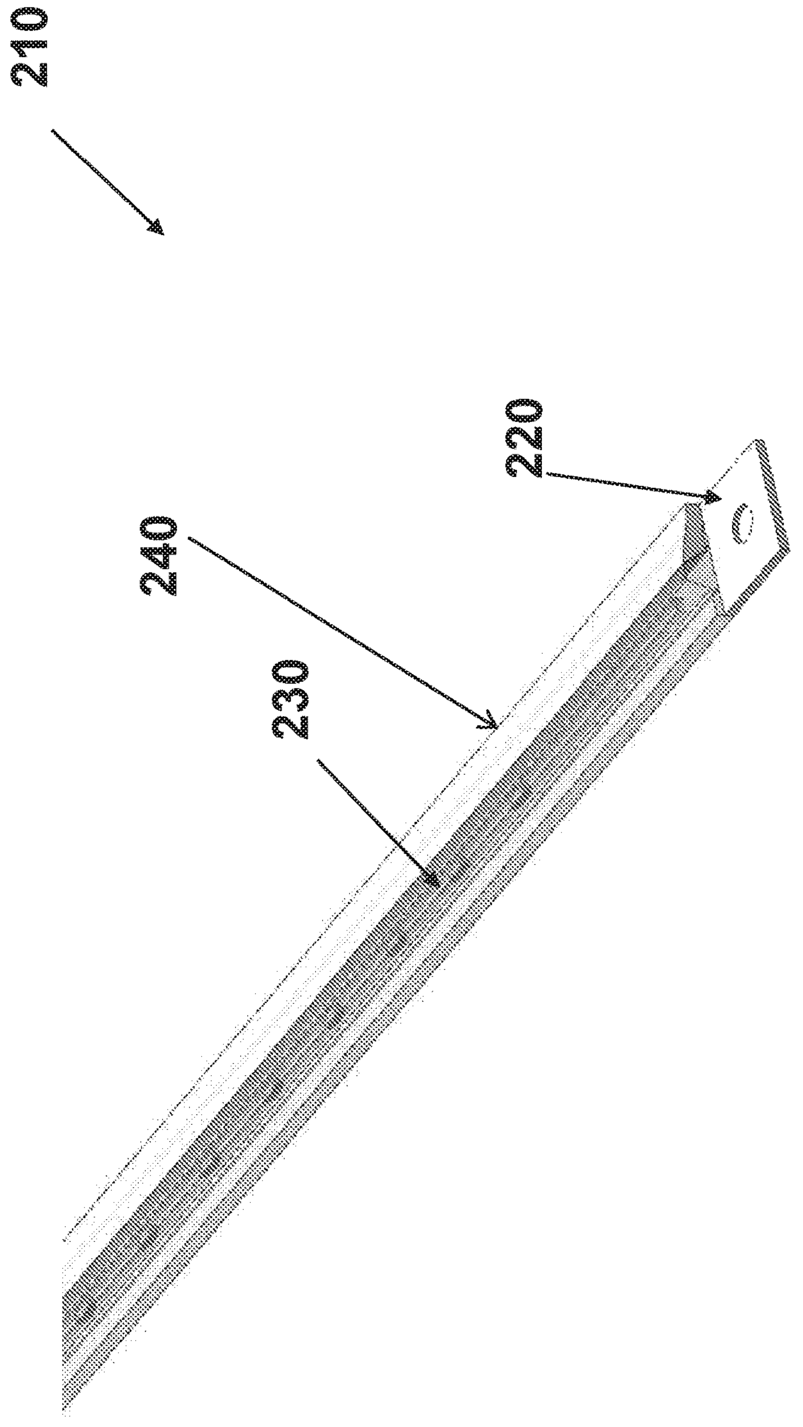
Figure 30:
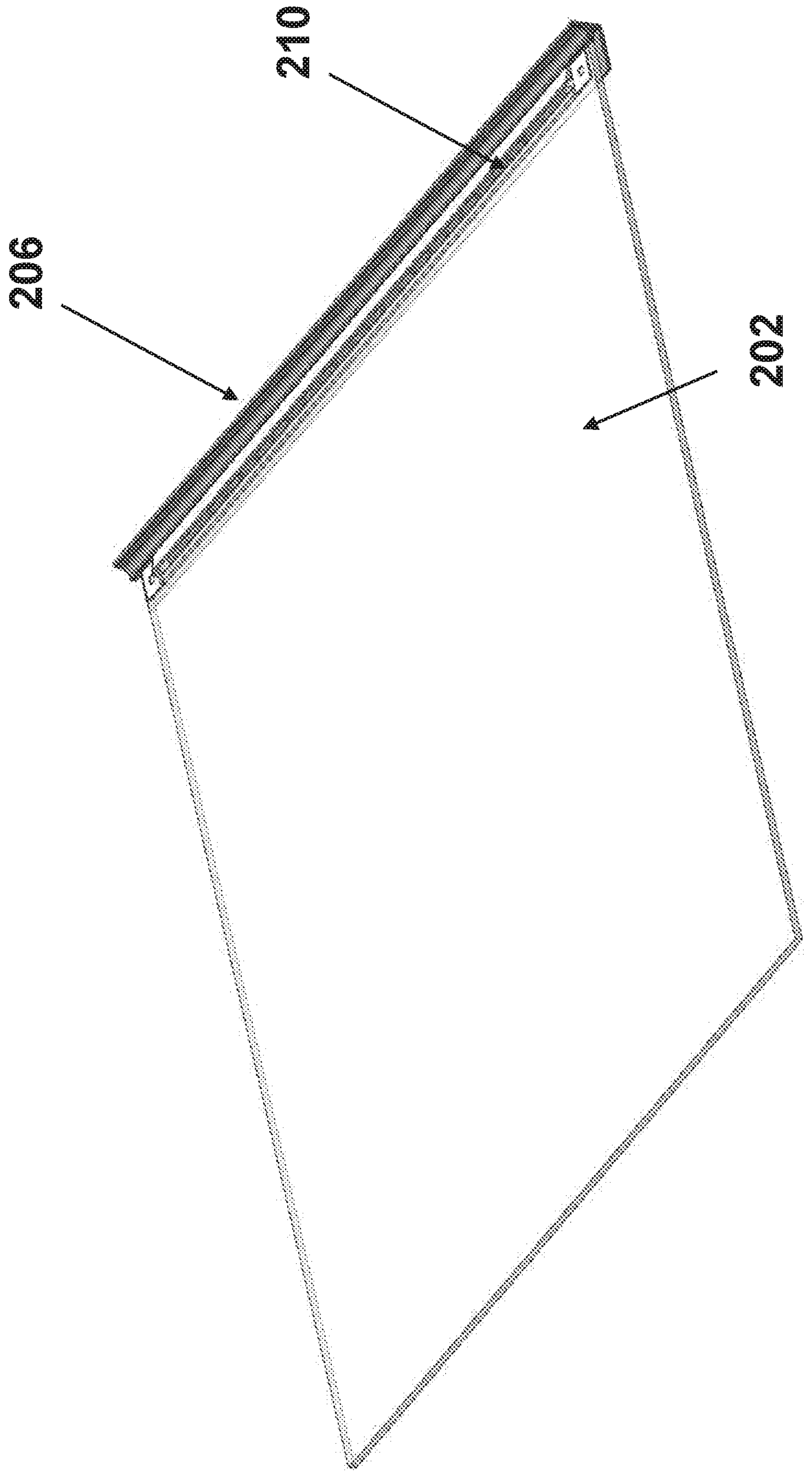
Figure 31:
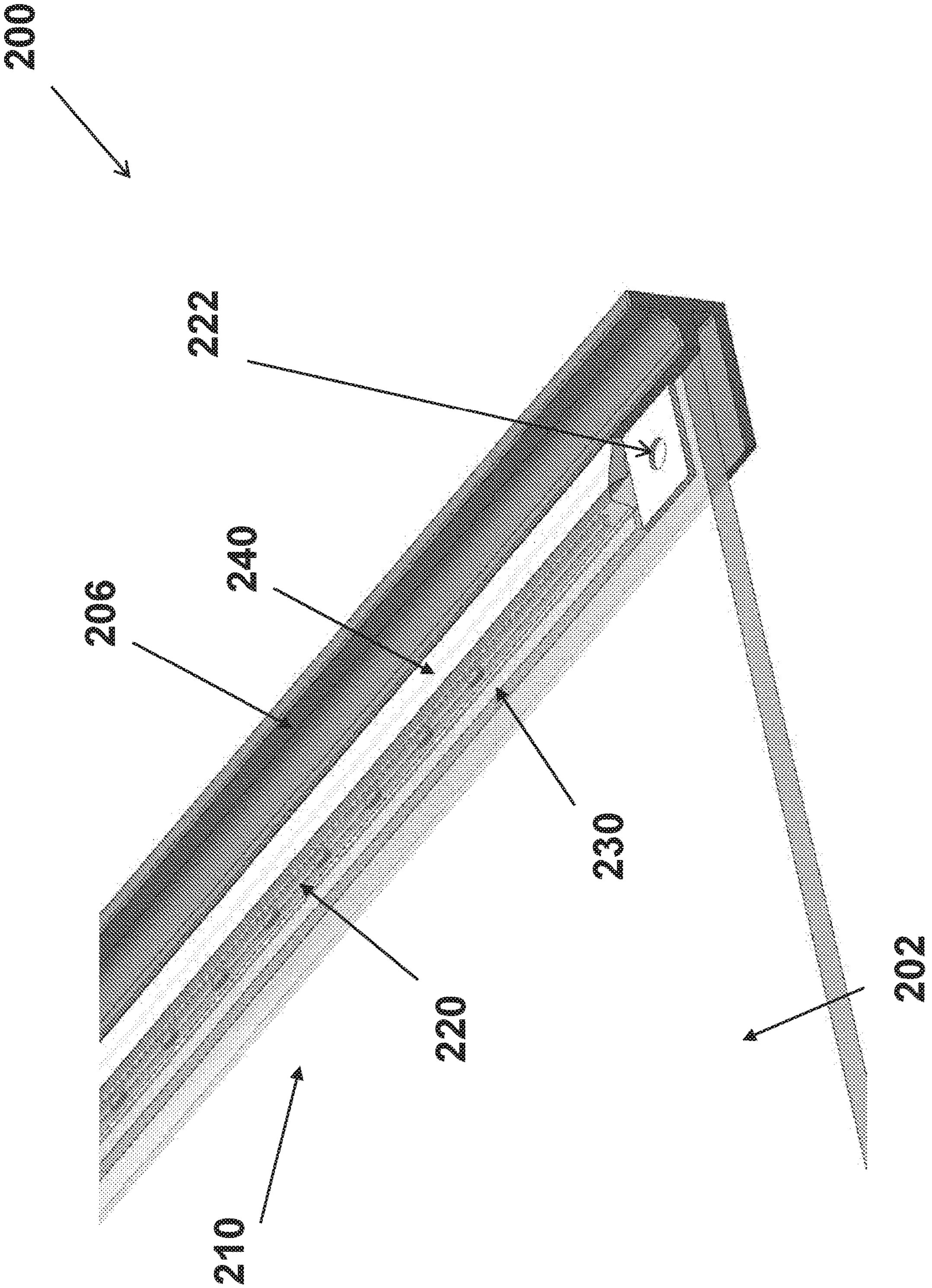
Figure 32:
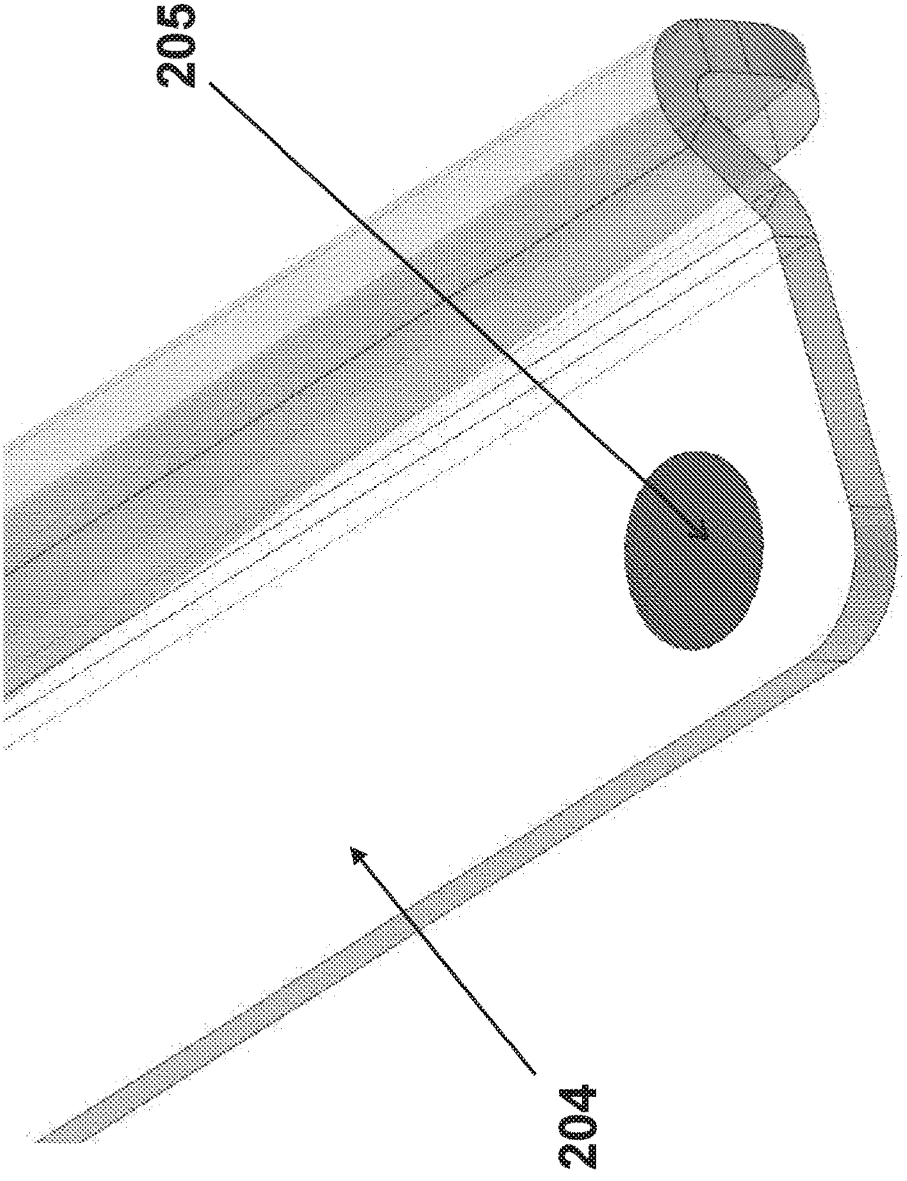
Figure 33:
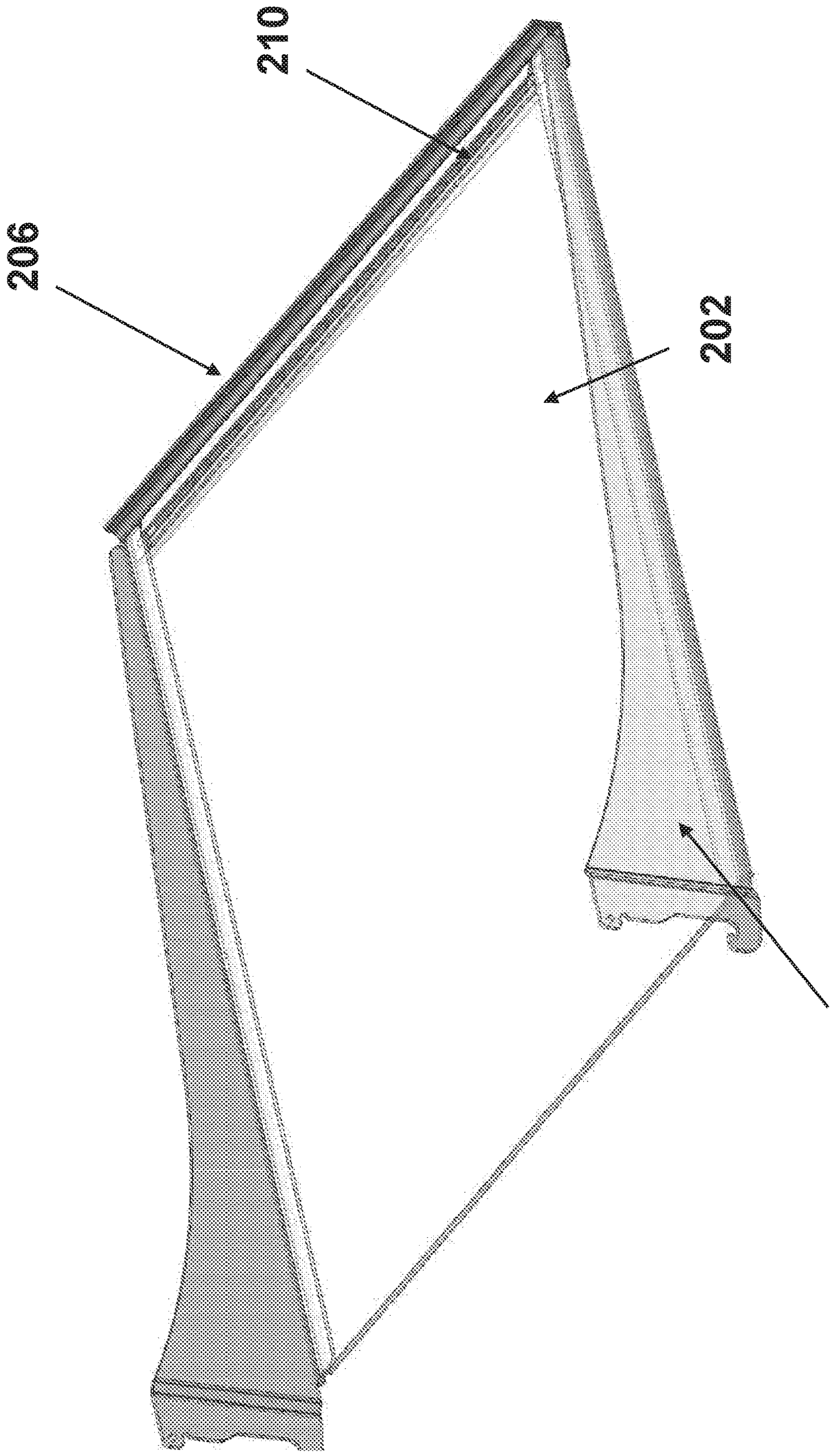
Figure 34:
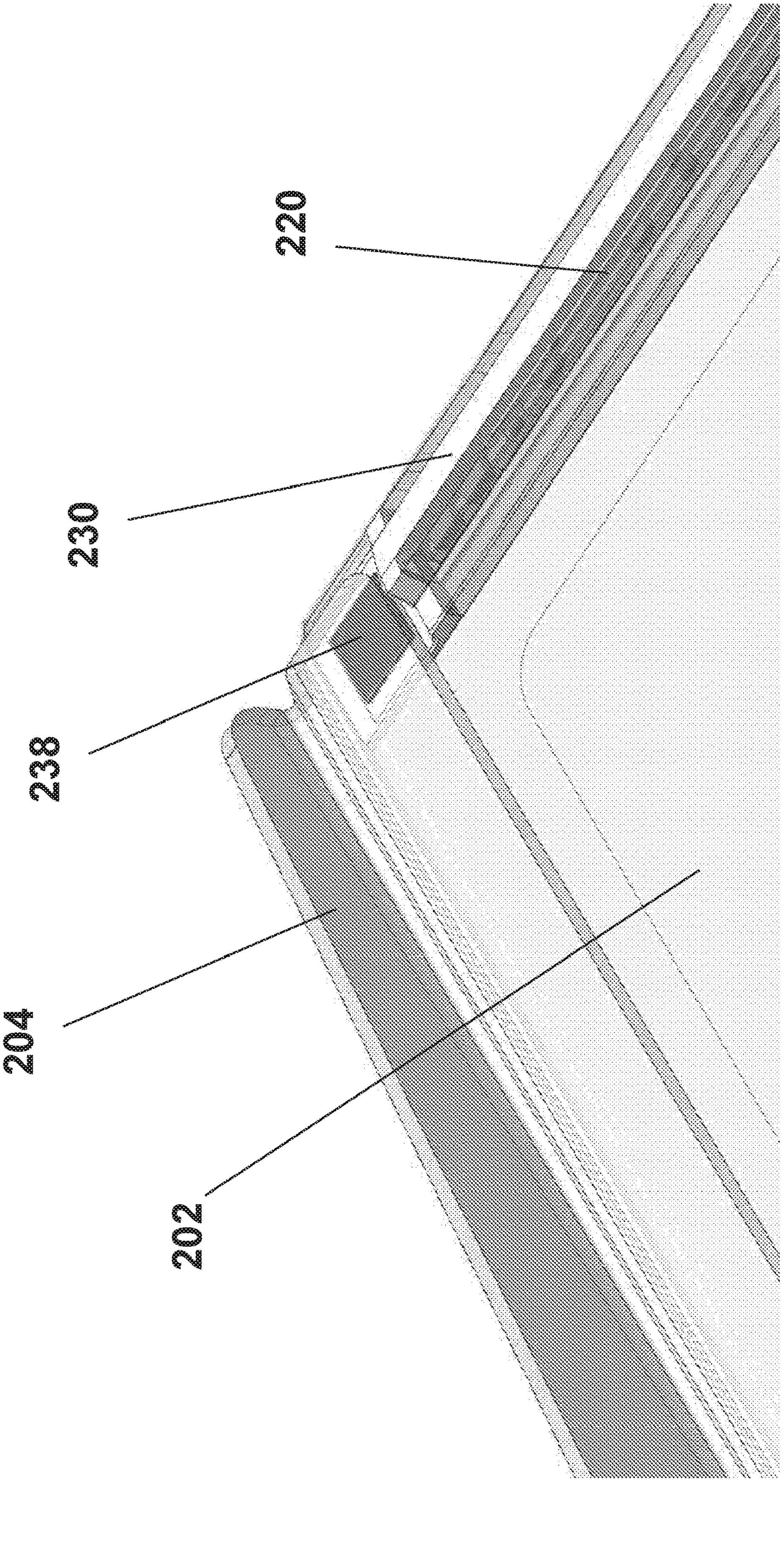
Figure 35:
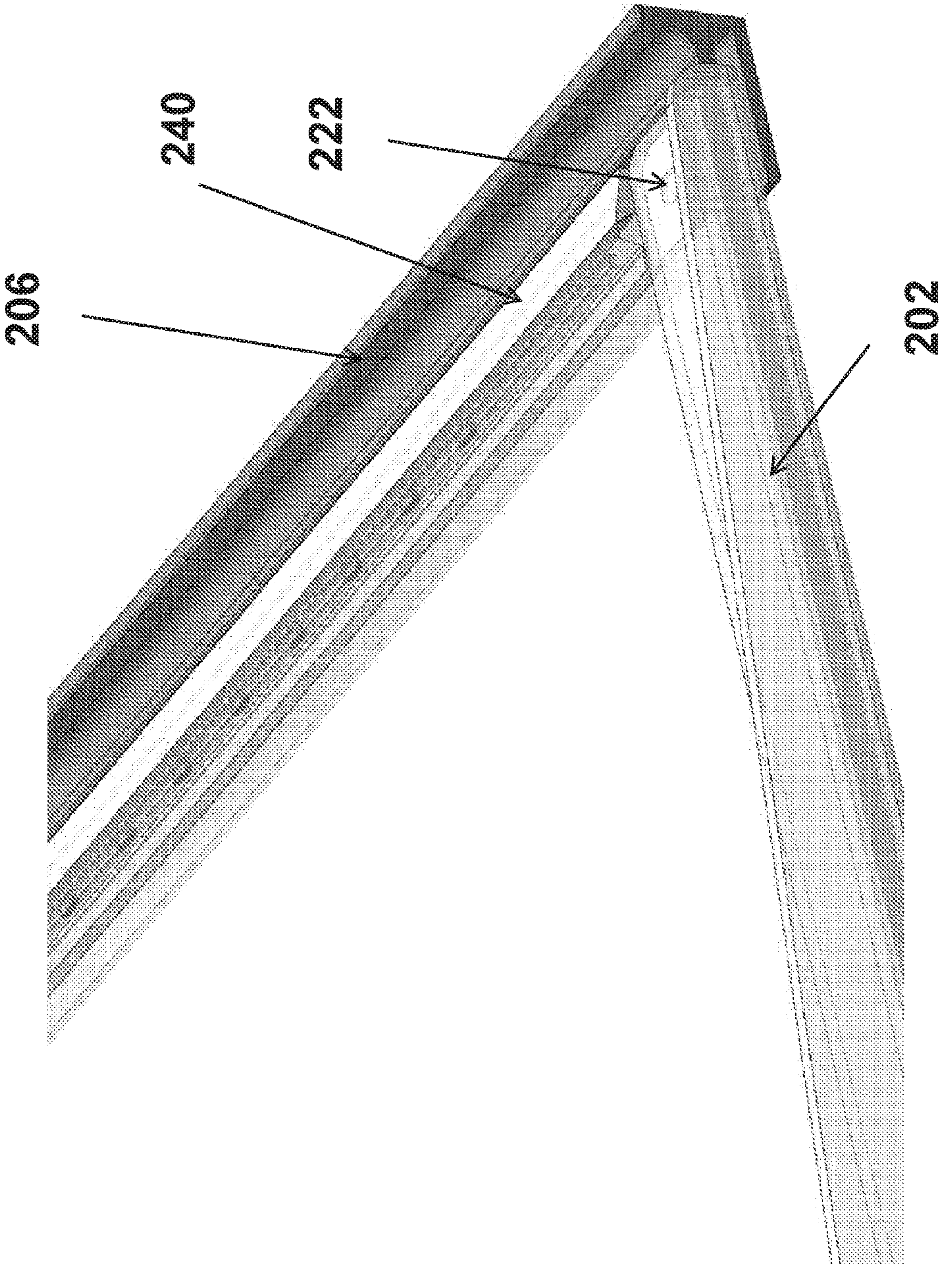

In the embodiment of a shelf assembly 200 shown in FIGS. 17-35, luminaire 210 is connected to shelf assembly 200 (as shown in particular in FIG. 31). Where luminaire 110 was connected to shelf assembly 100 with encapsulation, and used frame 106 as part of its housing and/or a reflector, luminaire 210 is connected to shelf assembly 200 with separately formed structural elements. Frame 206 serves to protect luminaire 210 from environmental conditions, and provides a finished appearance, but the individual components of luminaire 210 are formed, connected, and assembled independently, in the manner described below. Luminaire 210 has PCB 220 and lens 230, which function in similar fashion and are connected to one another in similar fashion to their like-numbered parts of prior embodiments. As shown in FIGS. 25 and 31, luminaire 210 further has a reflector 240 that is molded over lens 230. Reflector 240 serves to direct light transmitted by PCB 220 back into a target area.

Figure 22:
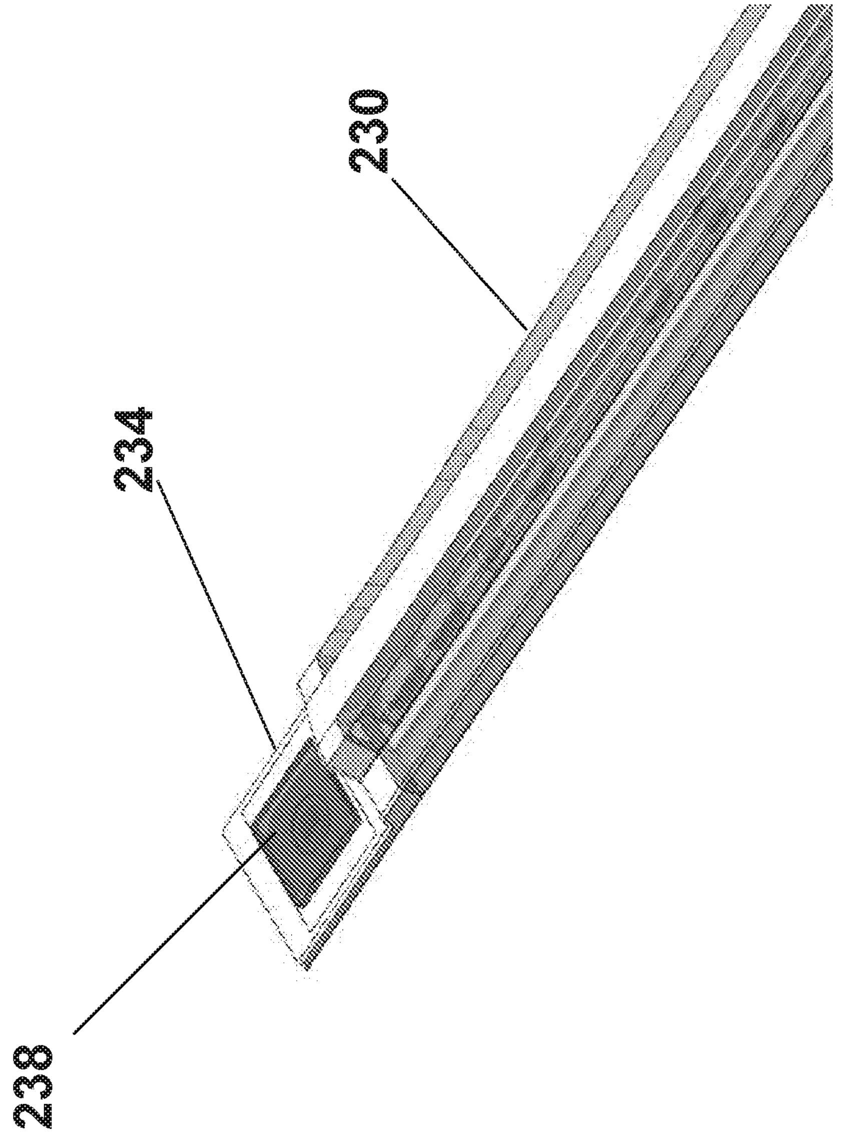
Figure 23:
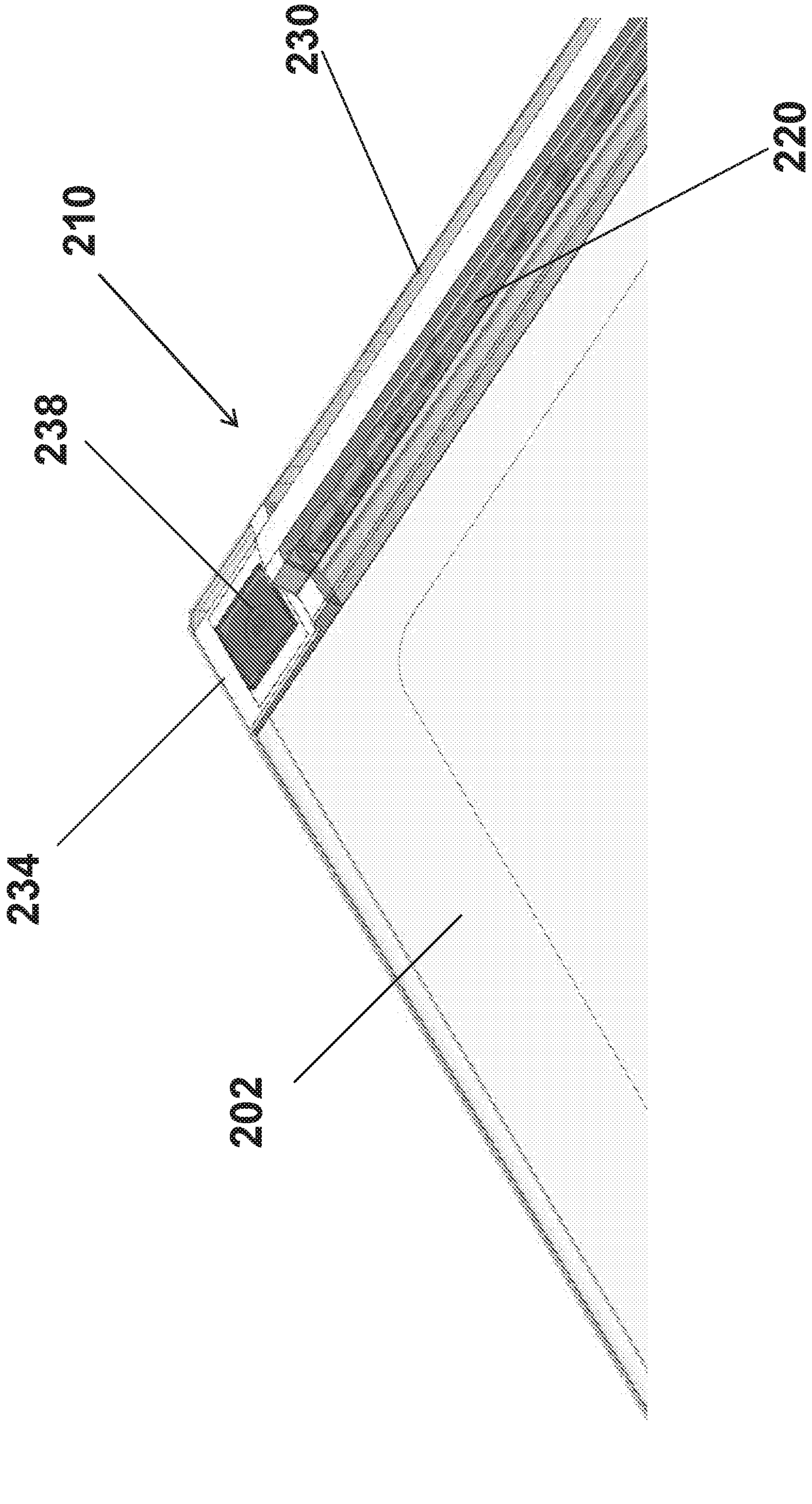
Figure 24:
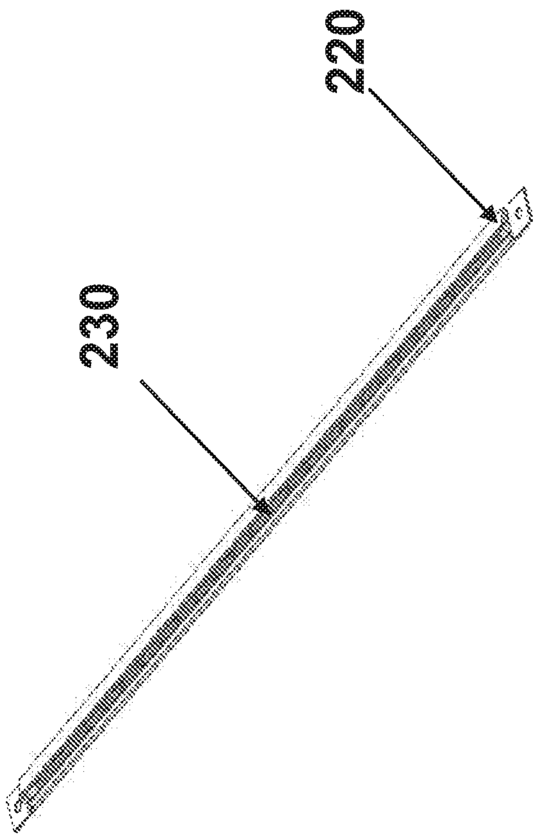

As shown in FIGS. 22 and 23, luminaire 210 can also have a contact pad 238 to facilitate and maintain the connection between interface 224, lens 230, and a power source. Pad 238 can be made of a conductive compound, such as solder or other conductive liquids, gels, or tapes. Pad 238 can be connected to or applied to any or all of brackets 204, lens 230, or PCB 220. Pad 238 can be used when second region 234 of lens 230 is conductive or insulating. As discussed above, a similar contact pad could be used with luminaire 110.

Figure 26:
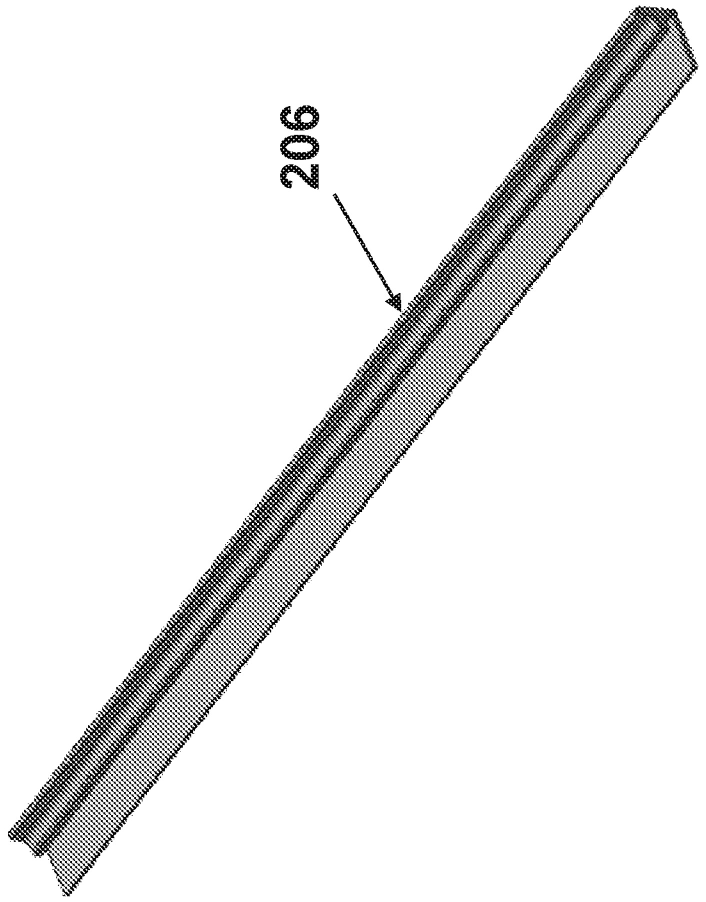
Figure 27:
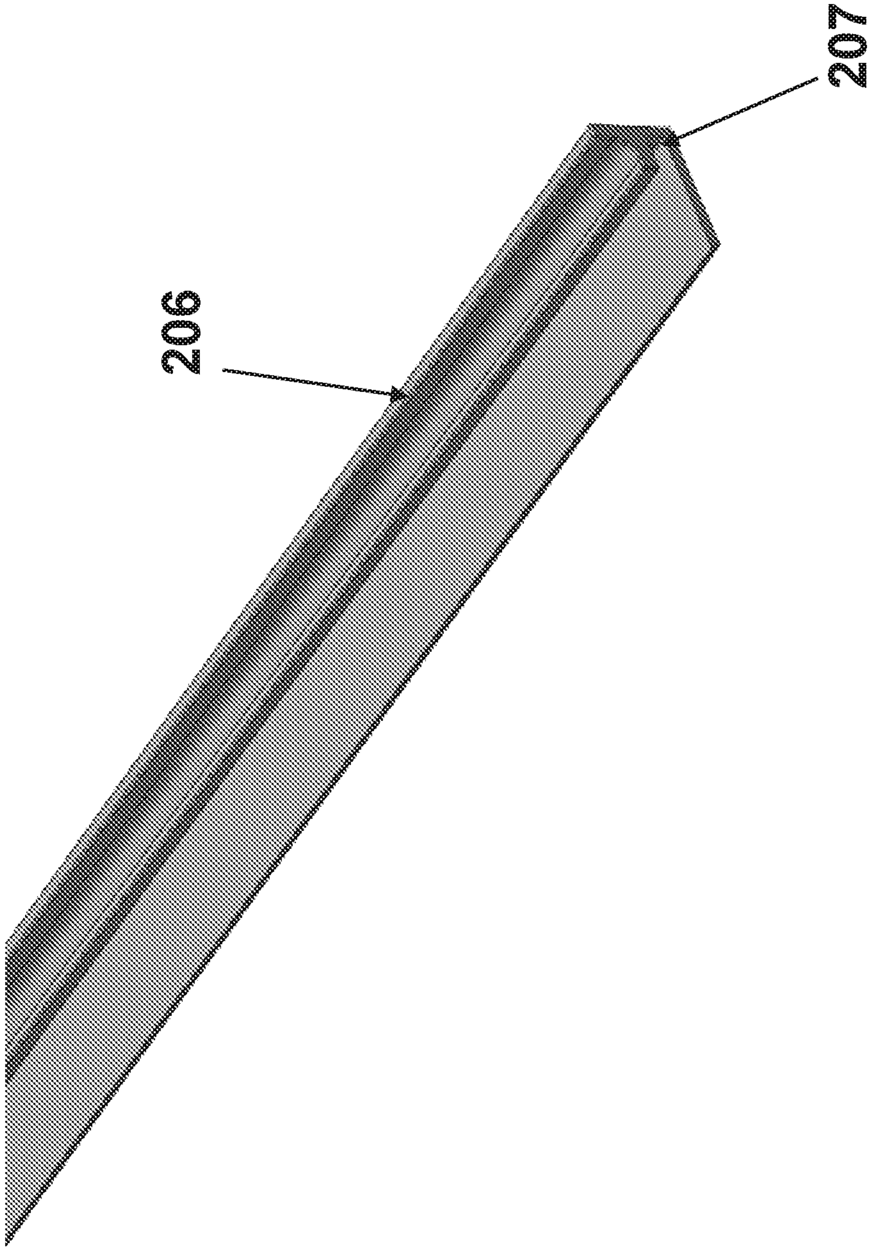
Figure 28:
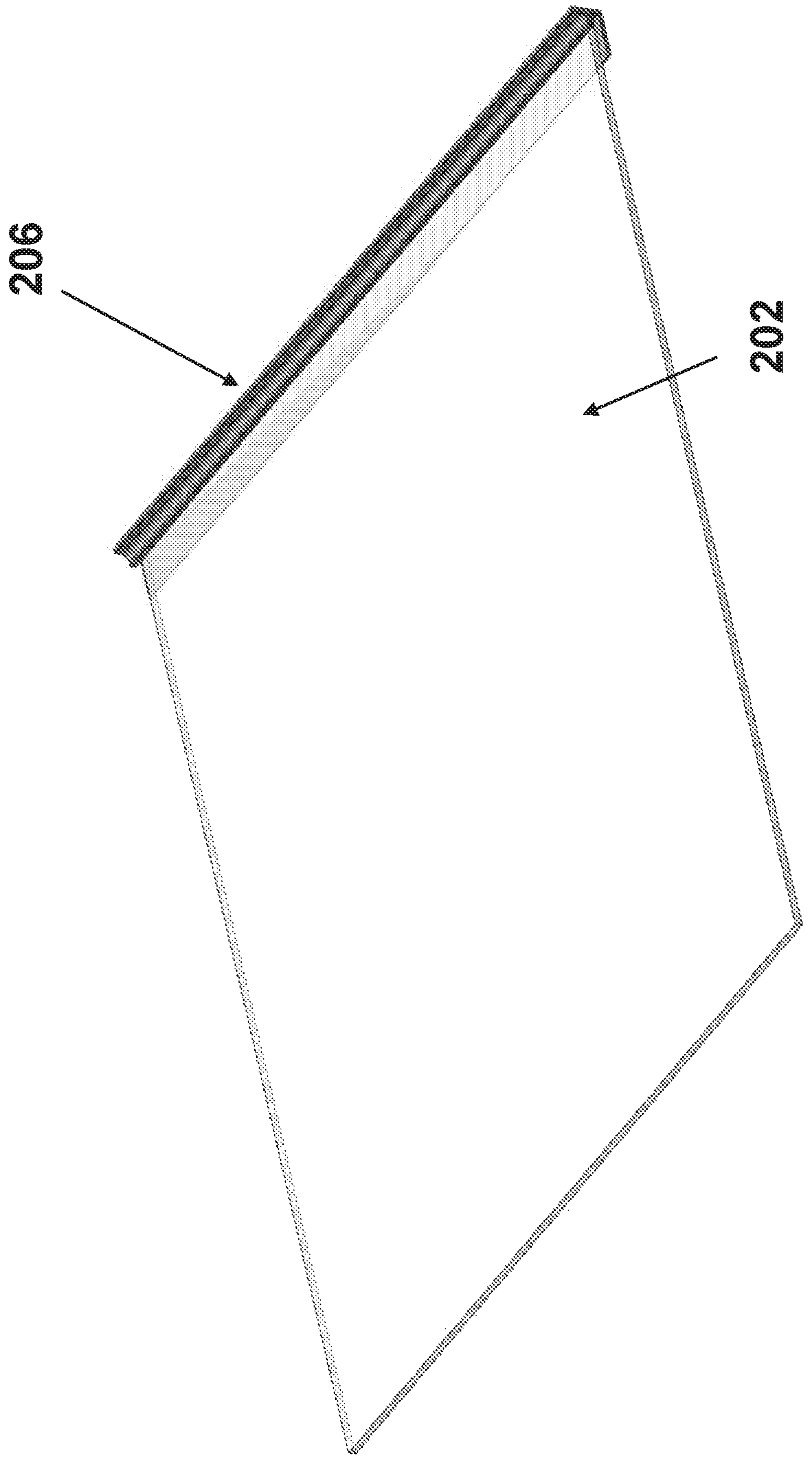
Figure 29:
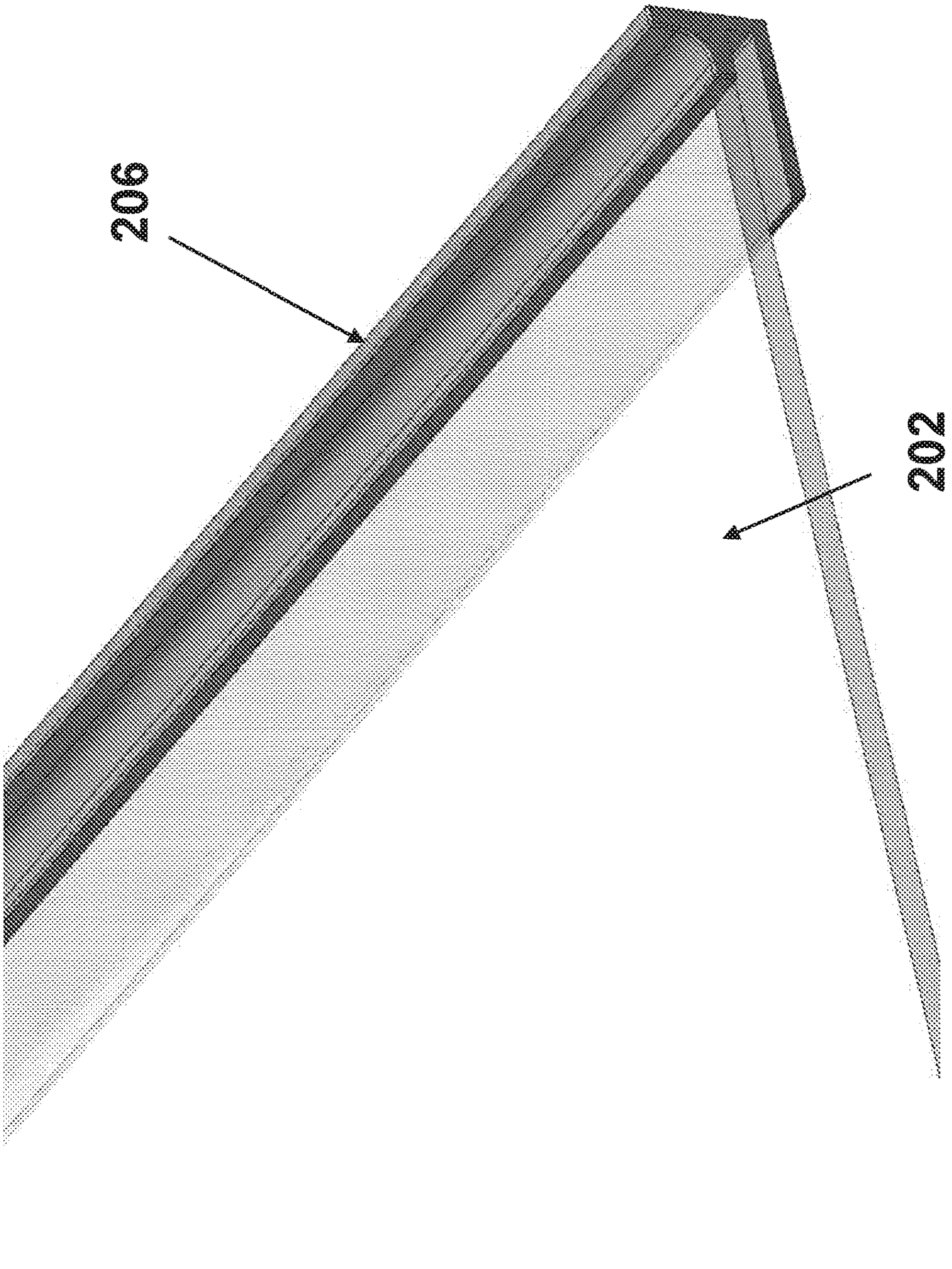

Shelf assembly 200 has front frame 206, the latter of which is shown in FIGS. 26 and 27. Front frame 206 can be extruded, molded, or fabricated from other processes. It can be made of metal (e.g., aluminum), plastic, or other suitable materials. Frame 206 can have a groove 207 thereon for receiving an edge of panel 202. Frame 206 can be affixed to panel 202 with an adhesive, such as any of those previously described (FIGS. 28 and 29). As shown in FIGS. 30 and 31, luminaire 210 is adhered to an underside of panel 202, adjacent to frame 206. Other methods of bonding frame 206 to panel 202 can be employed as well.

As shown in FIG. 31, lens 230 and reflector 240 do not extend all the way to the edge of the panel 202, so that an interface area 222 of the PCB 220 is exposed. Similarly to luminaire 110 and interface 124, when shelf assembly 200 is put together by adhering brackets 204 to panel 202 of FIG. 35, a conductive pad 205 (shown in FIG. 32) on side brackets 204 (FIG. 32) contacts the interface area 222 of FIG. 35. It is through this connection that the LEDs on PCB 220 are powered for illumination.

Figure 36:
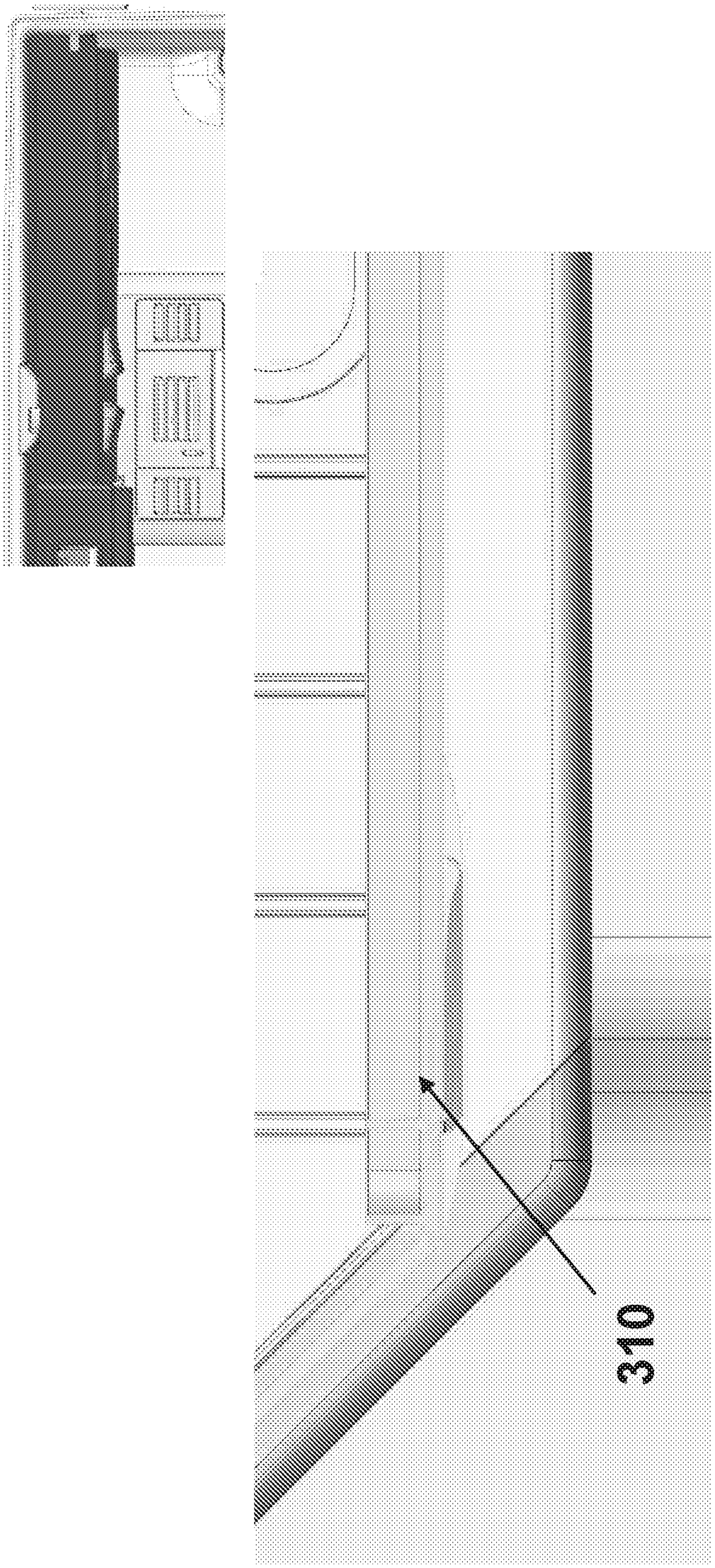
FIG. 36 shows a fourth embodiment of the luminaire of the present disclosure.

FIG. 36 shows a luminaire 310 that is installed for overhead illumination of a refrigerator interior. The slim profile of luminaire 310 allows for it to be surface mounted to the top surface of the refrigerator interior. Alternatively, a pocket (not shown) having a depth (e.g., 3 millimeters) can be formed in the top surface of the refrigerator cabinet so that luminaire 310 is flush with the surface.

Figure 37:
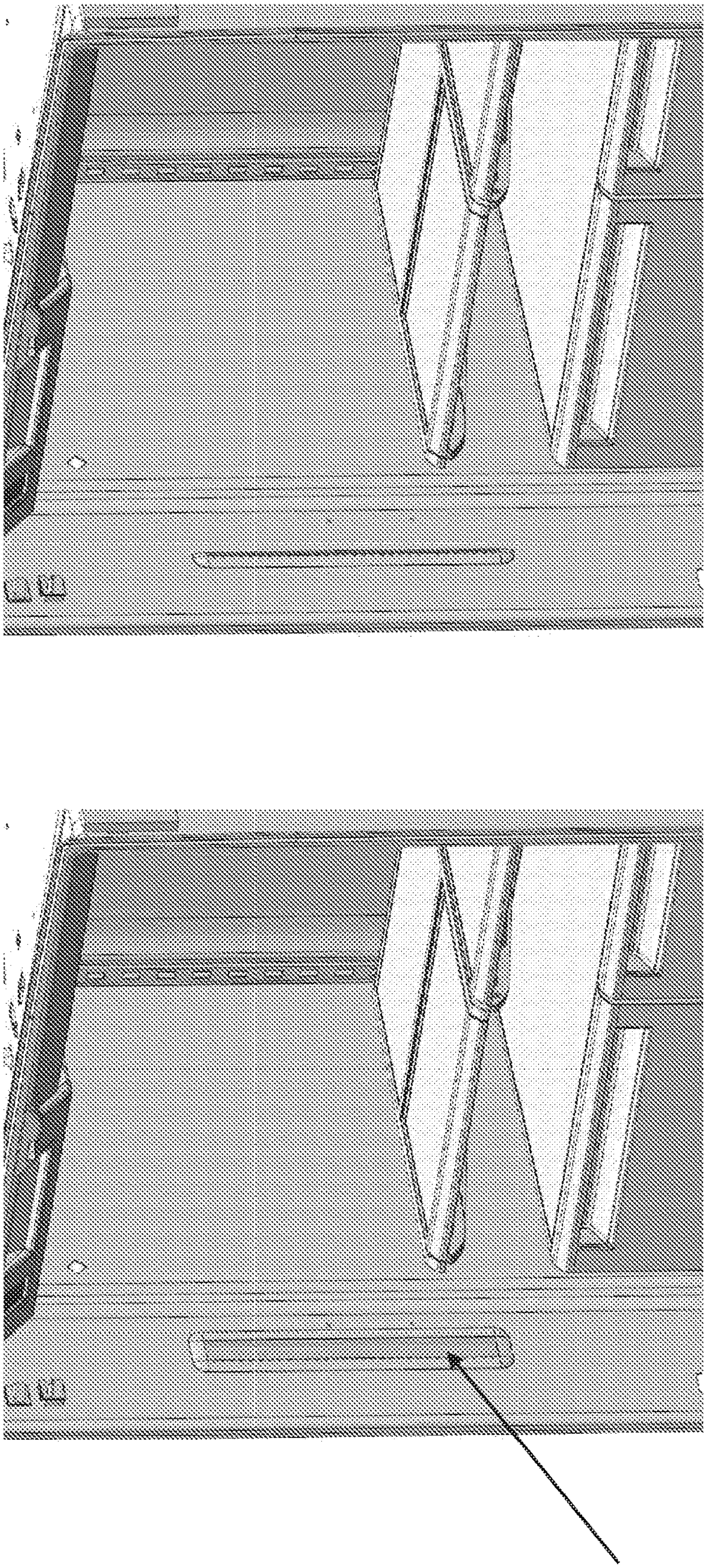
FIGS. 37-39 show a fifth embodiment of the luminaire of the present disclosure.
Figure 38:
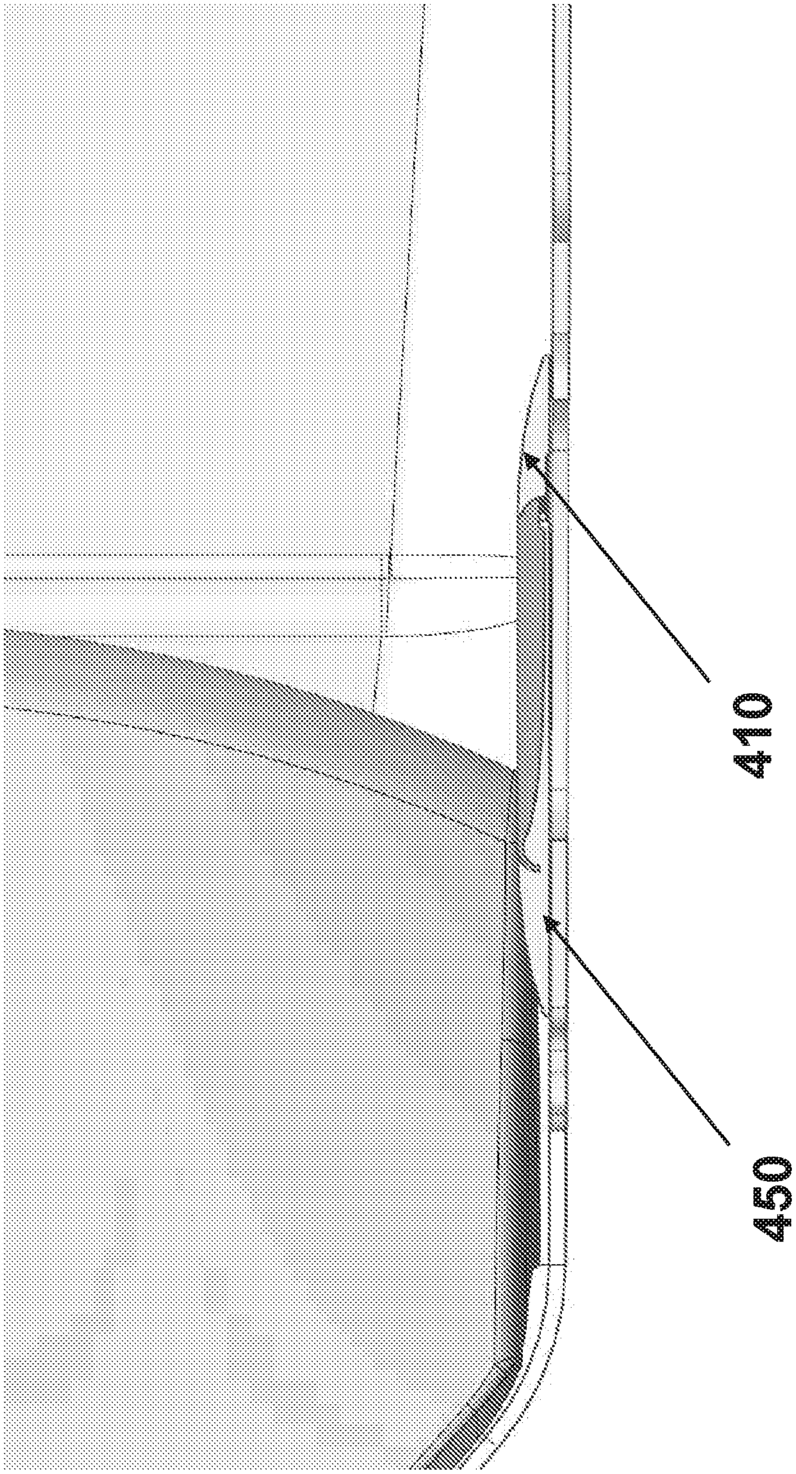
Figure 39:
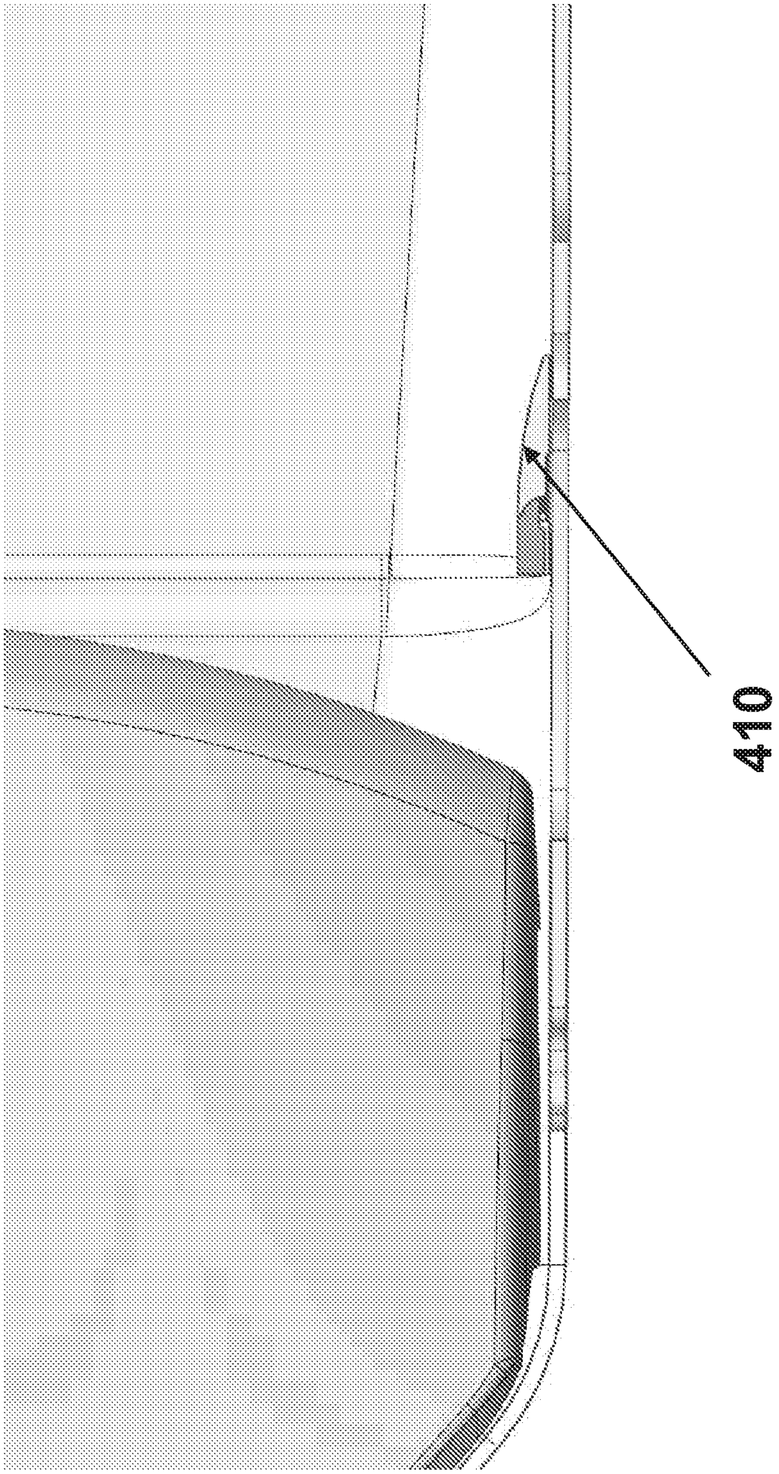

FIGS. 37-39 show luminaire 410, which is installed on the vertical side walls of a refrigerator cabinet, to illuminate the interior. Luminaire 410 can be installed with or without a decorative strip 450, the latter of which is shown in FIG. 38.

Figure 40:
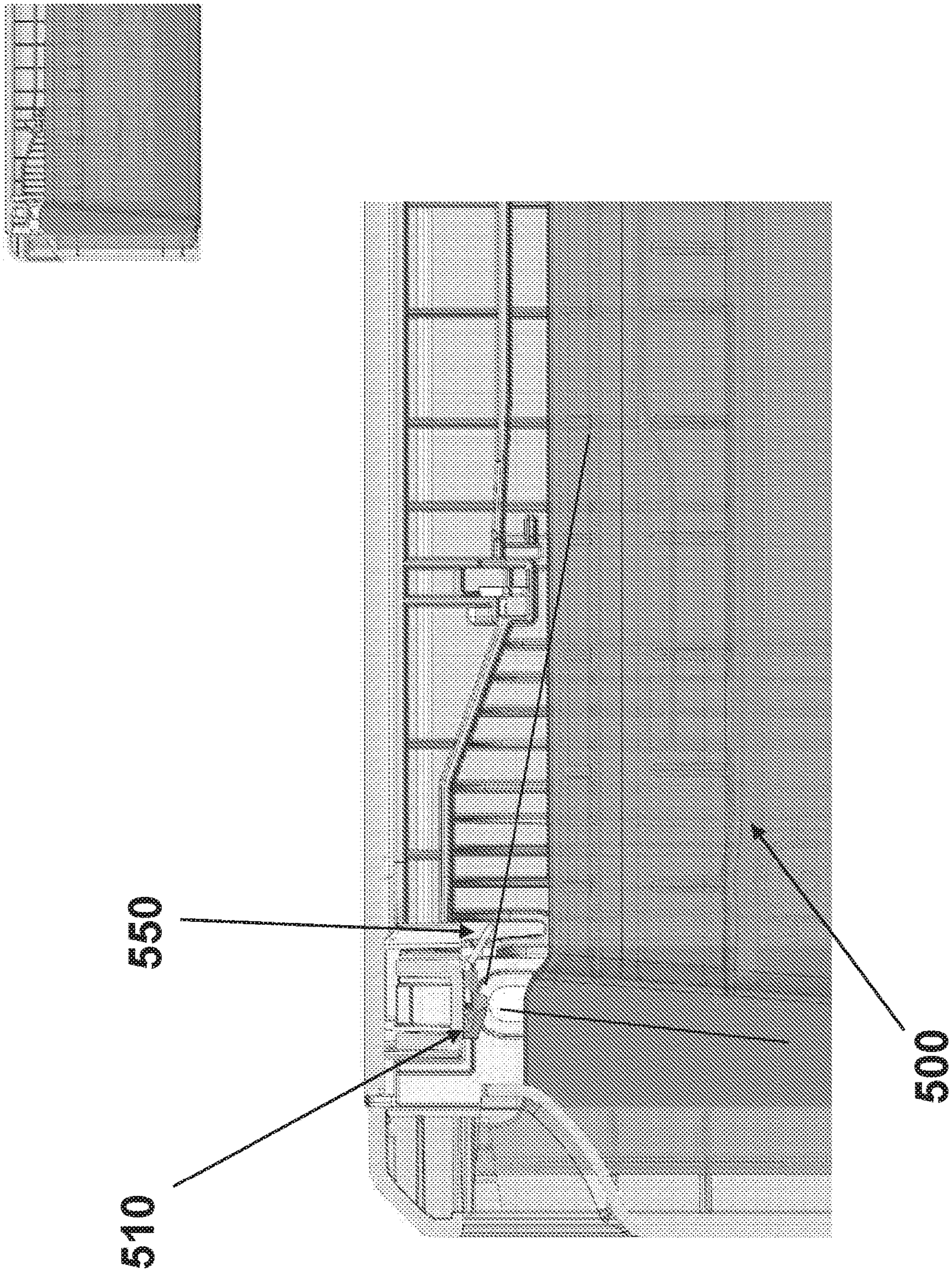
FIGS. 40-41 show a sixth embodiment of the luminaire of the present disclosure.
Figure 41:
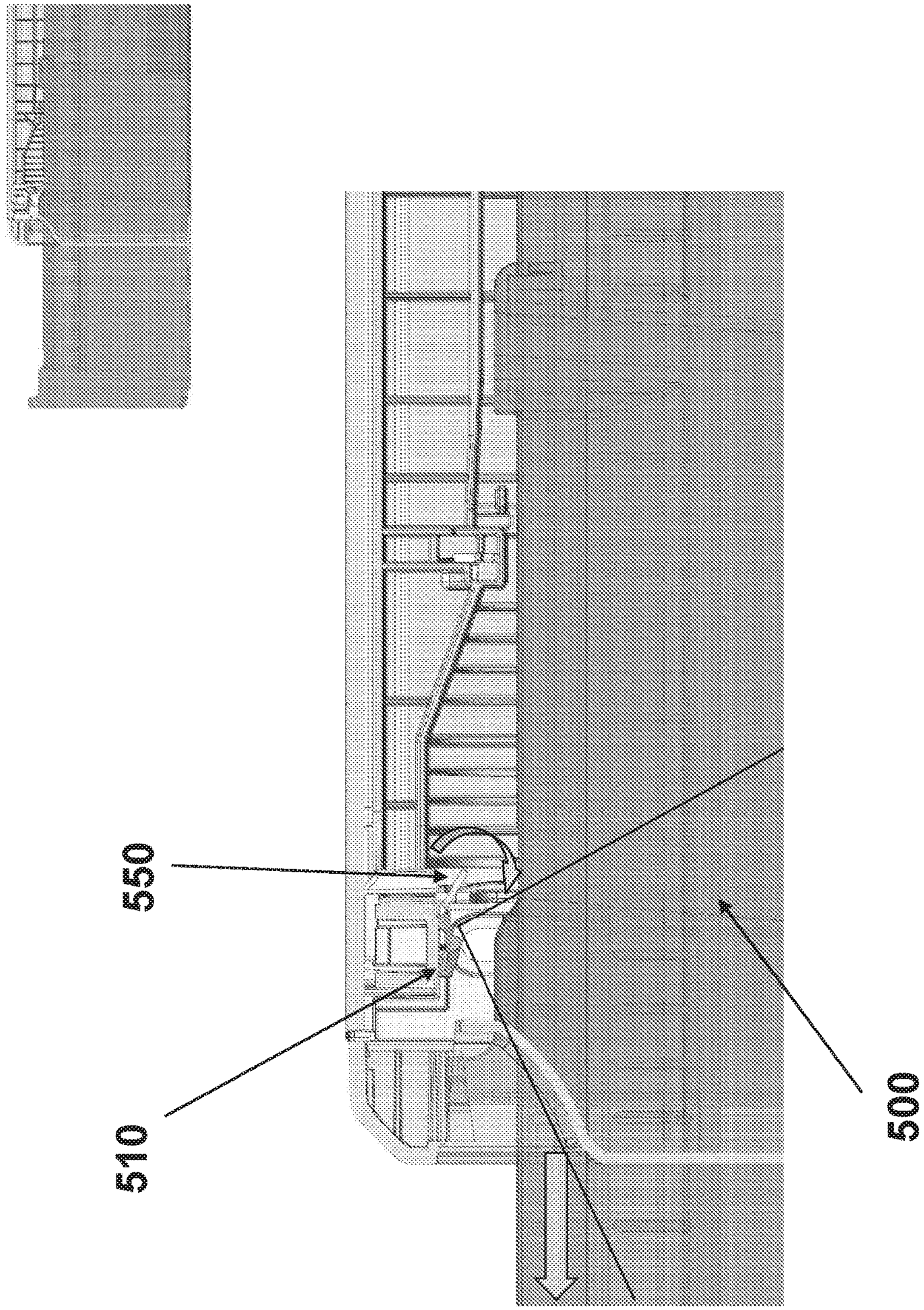

FIGS. 40 and 41 show luminaire 510, which is installed in a refrigerator crisper or drawer 500. Luminaire 510 has reflector 550 connected thereto, so that when drawer 500 is opened by the user, reflector 550 actuates to direct light from luminaire 510 into the open area of drawer 500.

Figure 42:
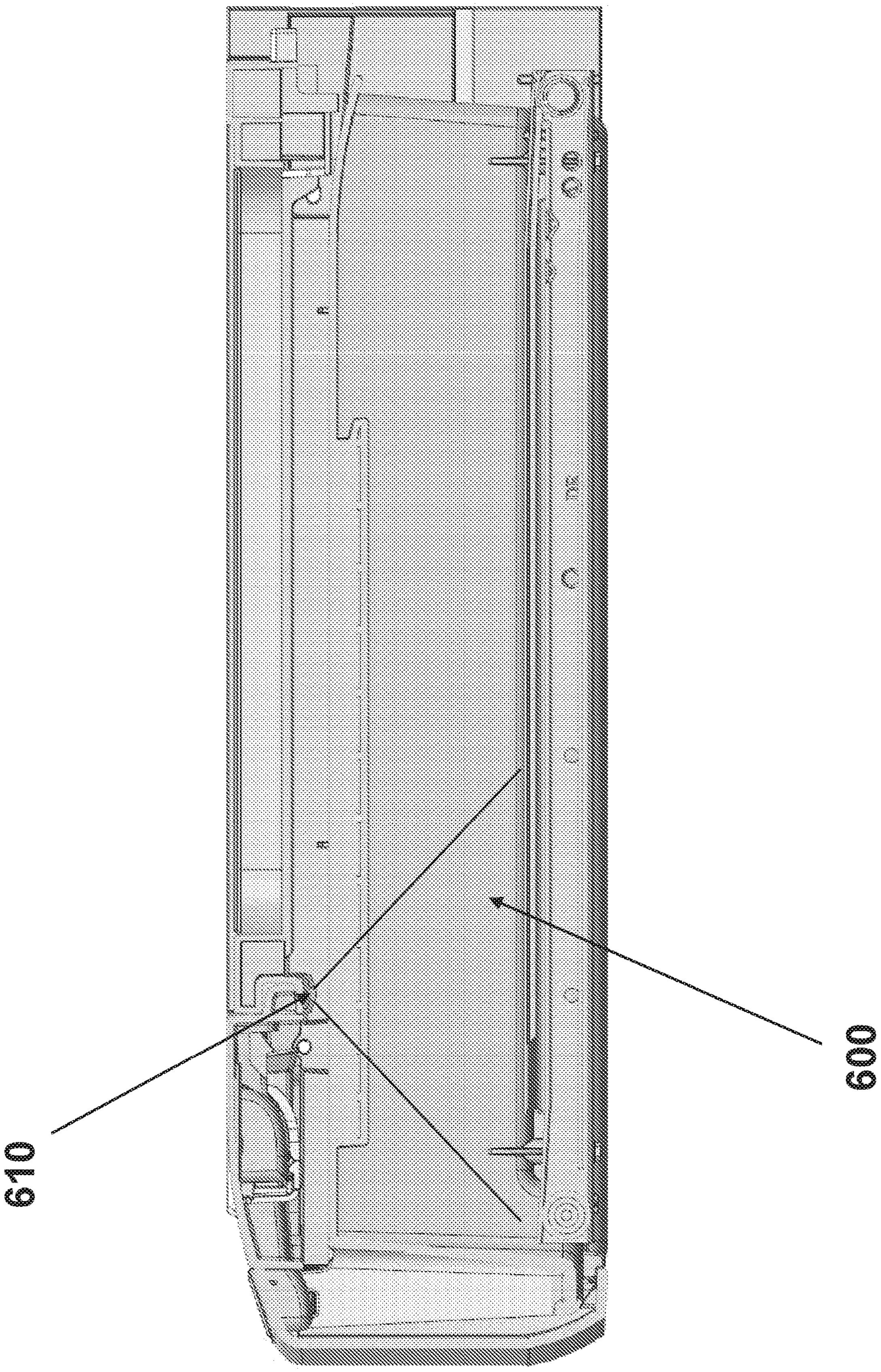
FIGS. 42-43 show a seventh embodiment of the luminaire of the present disclosure.
Figure 43:
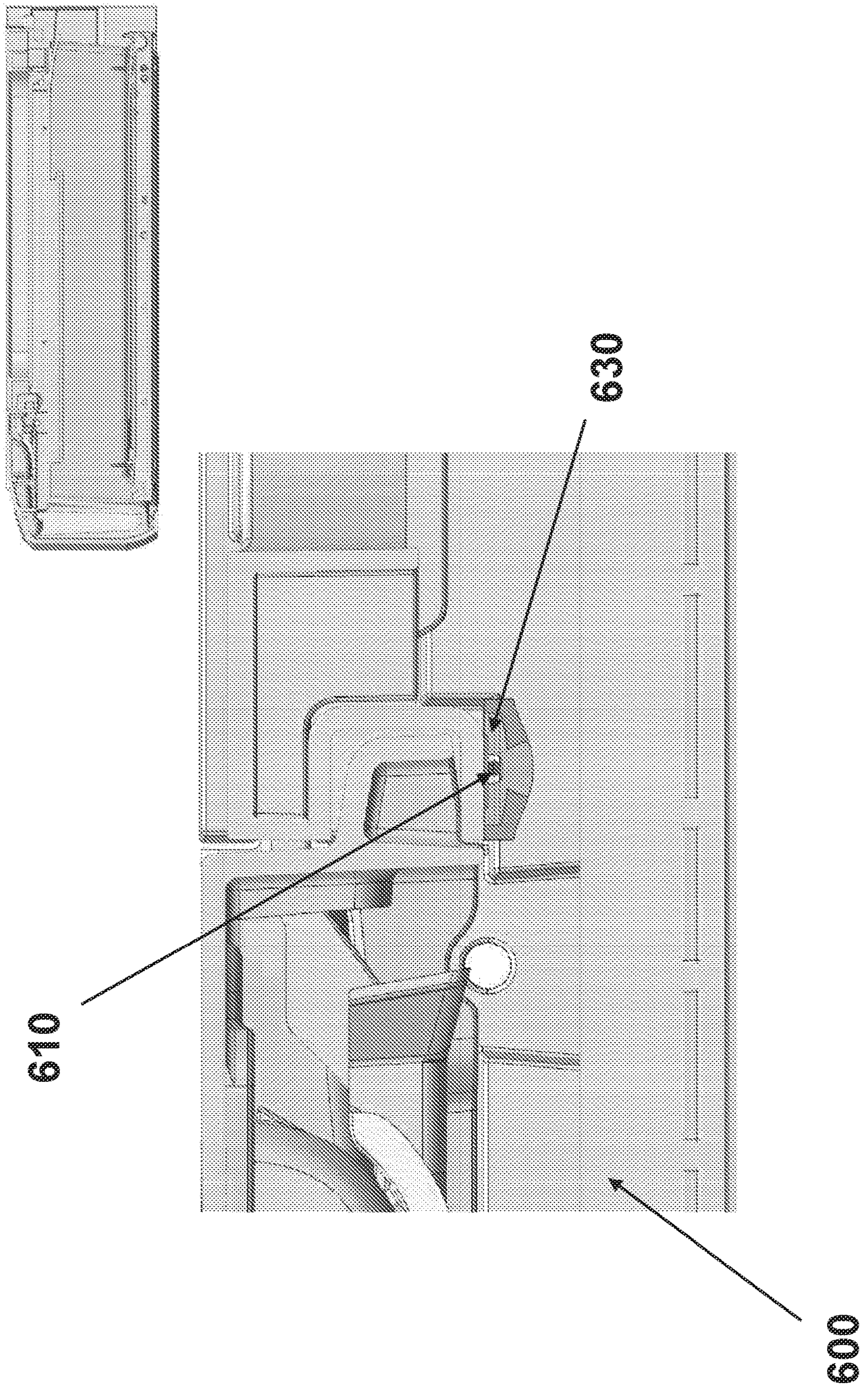
Figure 44:
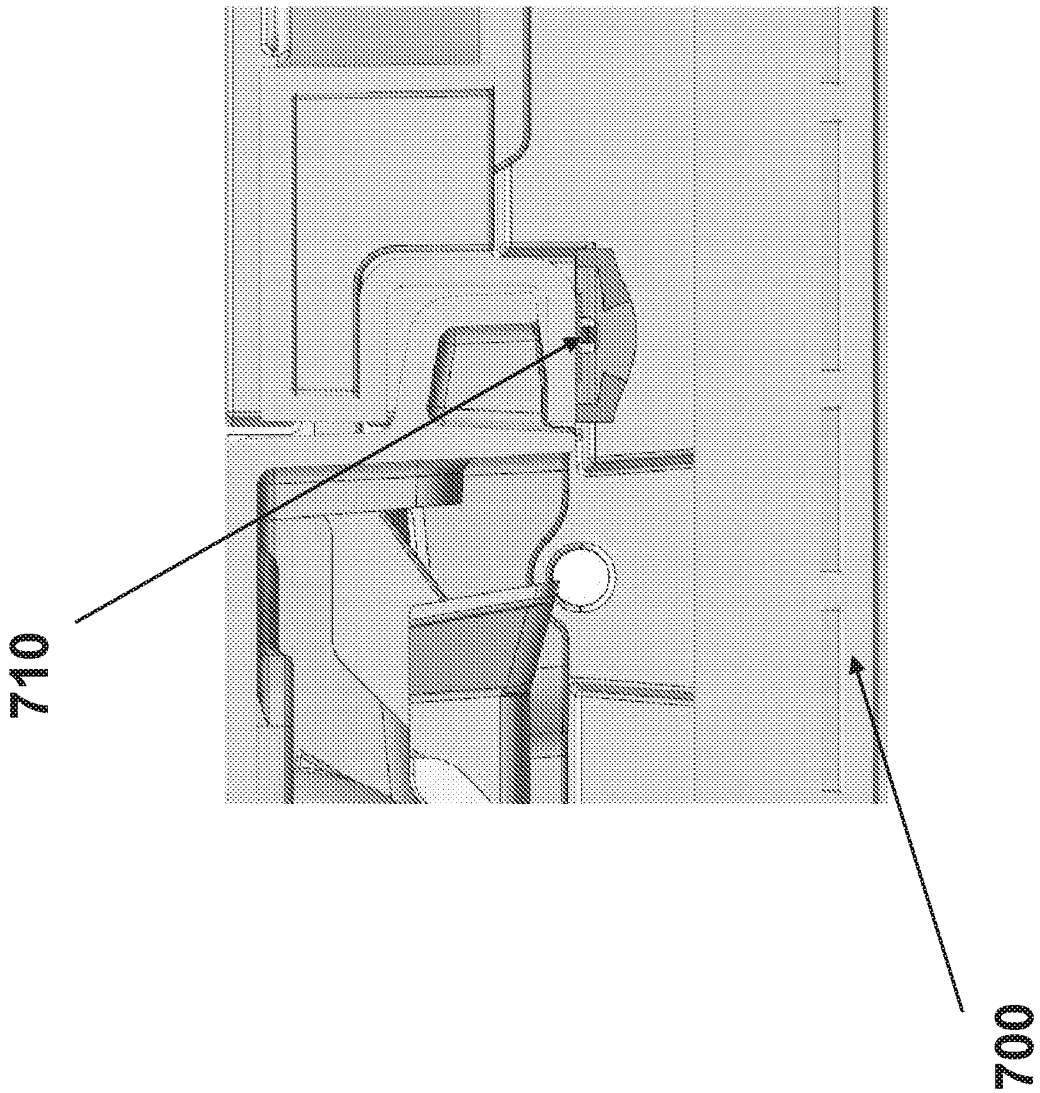
FIG. 44 shows an eighth embodiment of the luminaire of the present disclosure.

FIGS. 42 and 43 show luminaire 610 installed at the top of a refrigerator pantry drawer 600. Luminaire 610 has an architecture similar to that of luminaires 110 and 210. The lens 630 is designed so that the light given off by luminaire 610 has the desired spread across drawer 600. In FIG. 44, luminaire 710 is shown for installation in a freezer. Luminaire 710 is generally similar to luminaire 610, with the exception that luminaire 710 can give off an asymmetrical illumination pattern to illuminate more space at a front or outside end of the freezer cabinet.

Figure 45:
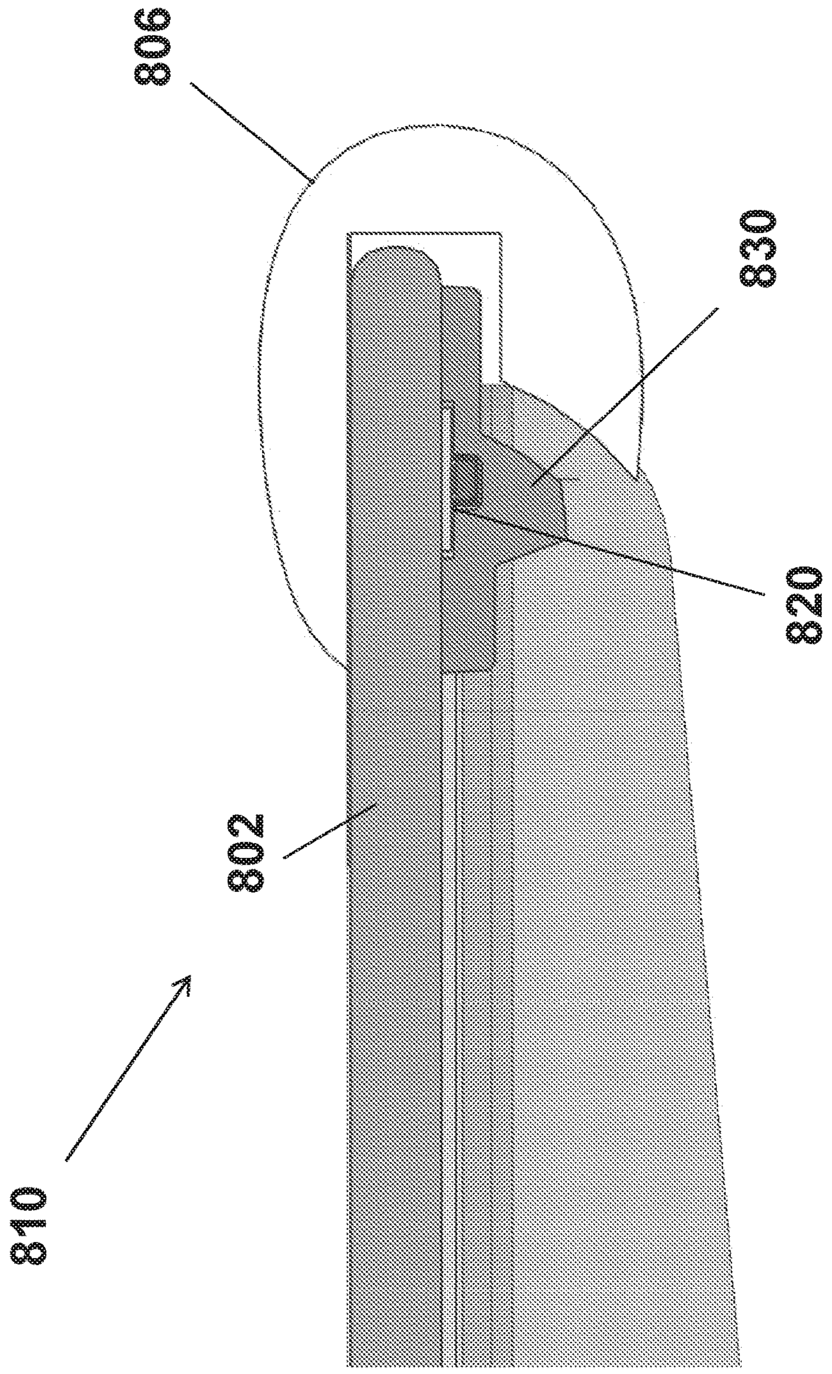
FIGS. 45 and 46 show a ninth embodiment of the luminaire of the present disclosure.
Figure 46:
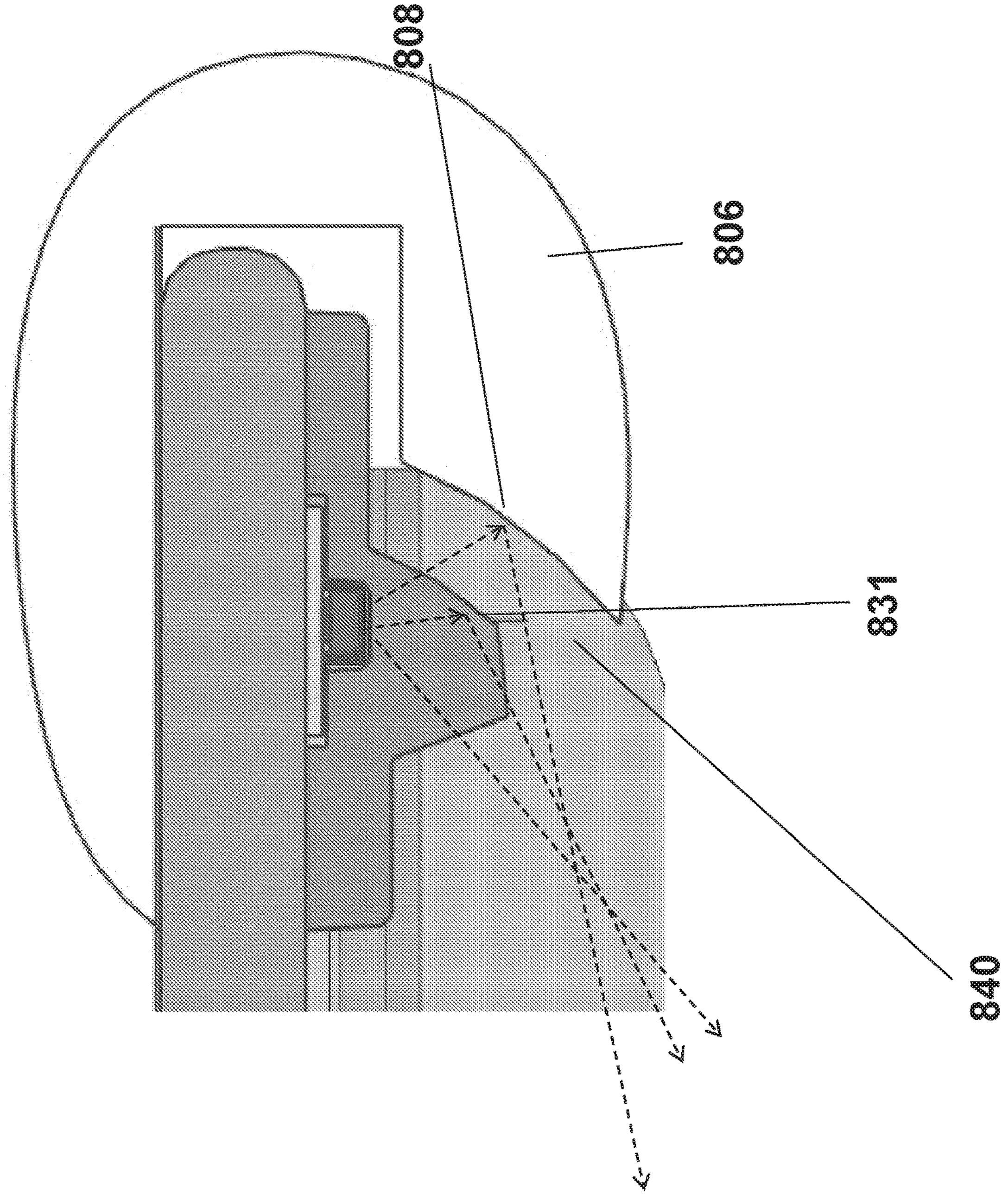

Referring to FIGS. 45 and 46, luminaire 810 is shown, and has PCB 820 and lens 830. Luminaire 810 is attached to panel 802, and has trim 806. Luminaire 810, PCB 820, lens 830, panel 802, and trim 806 each operate in the same manner as their similarly numbered components of prior embodiments, with the following exceptions.

Luminaire 810 uses the principle of total internal reflection (TIR) to reflect light towards the illumination target area. Lens 830 has an asymmetrical or symmetrical shape with a TIR optic surface 831 (FIG. 46), and there is an air gap 840 between lens 830 and trim 806 to provide the TIR effect. As shown in FIG. 46, light emanating from LEDs 822 hits surface 831. Due to the shape of surface 831 and the significant difference in indices of refraction between lens 830 and air gap 840, substantial or total TIR is achieved. Any light rays emanating from PCB 822 that are not internally reflected travel out of lens 830, through air gap 840, and bounce off reflective surface 808 of trim 806. The paths of light rays are shown in dotted lines. In luminaire 810, each of lens 830 and trim 806 (with reflective surface 808) can be used alone or in conjunction with one another.

In any of the above-described embodiments, the luminaires 10-810 can also be removably connected to the associated shelves or drawers. This removable connection could be, for example, a snap connection. A removably connected luminaire has several advantages, such as allowing the luminaire to be sold separately, for the customer to choose a desired color temperature, and for the luminaire to be serviceable without replacing the entire shelf. Luminaires 10-810 can also be sealed onto the associated shelf or drawer to that it is dishwasher safe.

Also, in any of the above-described embodiments, the luminaires can have a design that allows for PCBs with variable LED population and density, i.e. number of LEDs, while maintaining overall performance. Thus, the light intensity of the luminaire can be scalable without changing the lens or reflector. With this feature, the same lens and housing can become, for example, a 100 lumen, 200 lumen or 300 lumen luminaire with all the same parts. The luminaires can thus have scalable light output and cost. In addition, white liners, gray liners, and black liners require different levels of light to appear bright. With variable LED counts and densities, a universal product can easily fit a variety of applications.

The optical designs and light patterns of the luminaires of the present disclosure can also be changed by molding the lenses or housings out of different materials—for example, by molding the lens out of clear as compared to white plastic. Each material gives appreciably different optical patterns.

The luminaires of the present disclosure can also be used to illuminate graphics displayed on the associated glass panels. The luminaire can be under the panel, on top of the panel, shining through the glass, or as edge lighting. This can be particularly useful for highlighting any text or logos etched into the glass panel, such as a company brand name.

The luminaires of the present disclosure can also use power transferred via bus bars screened on the glass panel, as opposed to having to move power from the back of shelf to the front edge of the shelf with wires or other traditional methods. Such bus bars can be similar to what is used in commercial cooler doors to transfer power on the glass. Power can also be transferred using the side brackets of the shelf assembly, as discussed above.

With any luminaire of the present disclosure, a reflective surface can be applied to the inside of the front frame surface. The inside surface of the front frame can act as a reflector to project light into the target area.

The present disclosure also contemplates a feature that can be used with any of the above-described luminaires, whereby illumination can be interactive. There can be sensors on the shelf or luminaire (e.g., infrared sensors) that sense the presence of a person (e.g., by detecting the person's hand) and change the intensity of the emitted light. The sensors could also be used to change the color of the light.

In some applications, it can be suitable to apply a coating to the glass panel and or the frames that enhances the transfer of heat from a luminaire affixed to the shelf to the open air portion of the shelf. This will allow the luminaire to perform at higher light outputs. Such a coating could also be used to increase the reflective properties of the luminaire.

While the present disclosure has been described with reference to one or more particular embodiments, it will be understood by those skilled in the art that various changes can be made and equivalents can be substituted for elements thereof without departing from the scope thereof. In addition, many modifications can be made to adapt a particular situation or material to the teachings of the present disclosure without departing from the scope thereof. Therefore, it is intended that the present disclosure not be limited to the particular embodiment(s) disclosed as the best mode contemplated for carrying out this disclosure.

What is claimed is:

1. A shelf assembly comprising:

a shelf panel comprising a front edge and two side edges, wherein the shelf panel has a top surface and a bottom surface, the shelf panel having a flat profile;

a luminaire under the shelf panel, wherein the luminaire has a slim profile;

a frame that is connected to the front edge of the shelf panel and at least partially covers the luminaire, the frame defining a rearwardly and downwardly opening gap; and a shelf bracket that conducts electricity to the luminaire, the shelf bracket comprising:

a first area that conducts electricity from a support rail to the shelf bracket;

a second area that conducts electricity from the shelf bracket to the luminaire; and a non-electrically conductive coating applied to substantially all of the shelf bracket except the first and second areas, wherein a body of the shelf bracket is formed from an electrically conductive material that conducts electricity between the first and second areas, and wherein the body of the shelf bracket has a horizontal surface received within the gap of the frame.

2. The shelf assembly of claim 1, wherein a first electrically conductive material is applied to at least a portion of the first area and a second electrically conductive material is applied to at least a portion of the second area.

3. The shelf assembly of claim 1, wherein the luminaire has a first conductive contact area, and electricity is conducted from the second area to the first conductive contact area.

4. The shelf assembly of claim 1, wherein the second area comprises a second conductive contact area and the second conductive contact area is a pad, plastic, tape, liquid, gel, foam or solder.

5. The shelf assembly of claim 1, wherein the luminaire comprises one or more light sources, and the frame at least partially encapsulates the one or more light sources.

6. The shelf assembly of claim 1, wherein the luminaire is (a) connected to a bottom surface of the shelf panel, or (b) is directly connected to a bottom surface of the shelf panel adjacent to the front edge, and wherein the shelf bracket is connected to the side edge.

7. The shelf assembly of claim 1, further comprising a lens connected to a bottom surface of the shelf panel, wherein the luminaire comprises one or more light sources, and wherein the lens at least partially encapsulates the one or more light sources.

8. The shelf assembly of claim 7, further comprising a circuit board, wherein the lens comprises a groove therein and an outer lip, the circuit board is within the groove, and the outer lip contacts the bottom surface of the shelf panel to at least partially encapsulate the circuit board between the lens and the shelf panel.

9. The shelf assembly of claim 7, wherein the luminaire further comprises a circuit board, and wherein the lens contacts the circuit board.

10. The shelf assembly of claim 1, further comprising a circuit board and a lens that at least partially encapsulates the luminaire, wherein the circuit board has a first exposed area at a first end thereof not encapsulated by the lens, and wherein the shelf bracket contacts the circuit board at the first exposed area.

11. The shelf assembly of claim 10, further comprising a conductive contact pad between the shelf bracket and the first exposed area.

12. The shelf assembly of claim 1, wherein the luminaire is (a) integrated into the shelf assembly so that the frame functions as a lens or a housing for the luminaire, or (b) is permanently connected to the shelf assembly.

13. A shelf assembly, comprising:

a shelf panel comprising a front edge, two side edges, a top surface, and a bottom surface;

a light assembly affixed to the bottom surface of the shelf panel, the light assembly comprising:

a circuit board having one or more light sources thereon; and a lens affixed to the circuit board to at least partially encapsulate the one or more light sources; and a frame that is connected to the front edge of the shelf panel and is adjacent to and at least partially covers the light assembly, wherein the frame comprises a flat portion that contacts the top surface of the shelf panel.

14. The shelf assembly of claim 13, wherein the luminaire is permanently connected to the shelf assembly.

15. A shelf assembly, comprising:

a shelf panel comprising a front edge and two side edges, wherein the shelf panel has a top surface and a bottom surface, the shelf panel having a flat profile;

a luminaire located under the shelf panel, the luminaire comprising one or more light sources, a circuit board having the one or more light sources coupled thereto, and a lens configured to receive light from the one or more light sources therethrough, wherein the luminaire has a slim profile; and a frame that is connected to the front edge of the shelf panel and extends above and below the top and bottom surfaces of the shelf panel adjacent to the front edge, the frame at least partially covering the luminaire;

wherein the lens comprises a groove therein and an outer lip, the circuit board being within the groove, and the outer lip contacting the bottom surface of the shelf panel to at least partially encapsulate the circuit board between the lens and the shelf panel.

16. The shelf assembly of claim 15, wherein the lens (a) at least partially encapsulates the one or more light sources, or (b) contacts the bottom surface of the shelf panel.

17. The shelf assembly of claim 15, further comprising a first shelf bracket and a second shelf bracket; and wherein the luminaire is connected (a) to the bottom surface of the shelf panel adjacent to the front edge, and wherein each of the first and second shelf brackets are connected to the side edges, or (b) to the first shelf bracket and the second shelf bracket.

18. The shelf assembly of claim 17, wherein the circuit board has a first exposed area at a first end thereof not encapsulated by the lens, and wherein the first shelf bracket contacts the circuit board at the first exposed area.

19. The shelf assembly of claim 18, further comprising a conductive contact pad between the first shelf bracket and the first exposed area.

20. The shelf assembly of claim 15, wherein the luminaire (a) is connected to the bottom surface of the shelf panel, or (b) is integrated into the shelf assembly so that the frame functions as the lens or a housing for the luminaire.

21. The shelf assembly of claim 15, further comprising a first shelf bracket and a second shelf bracket, wherein the luminaire is adjacent to a front of the first and second shelf brackets.

22. The shelf assembly of claim 21, wherein at least one of the first shelf bracket and the second shelf bracket is a conductive shelf bracket and comprises:

a first area that conducts electricity from a support rail to the conductive shelf bracket;

a second area that conducts electricity from the conductive shelf bracket to the luminaire; and a non-electrically conductive coating applied to substantially all of the conductive shelf bracket except the first and second areas, wherein the conductive shelf bracket is formed from an electrically conductive material that conducts electricity between the first and second areas, and wherein the conductive shelf bracket has a horizontal surface beneath the shelf panel that supports the shelf panel and the luminaire.

23. The shelf assembly of claim 22, wherein (a) a first electrically conductive material is applied to at least a portion of the first area and a second electrically conductive material is applied to at least a portion of the second area, (b) the luminaire has a first conductive contact area, and electricity is conducted from the second area to the first conductive contact area, or (c) the second area comprises a second conductive contact area.

24. The shelf assembly of claim 15, wherein the frame (a) at least partially covers an edge portion the luminaire adjacent to the front edge of the shelf panel, or (b) is made of a plastic material.

25. The shelf assembly of claim 15, wherein the luminaire (a) further comprises a circuit board, and wherein the lens contacts the circuit board, or (b) is permanently connected to the shelf assembly.

* * * * *